United States Patent
Maeda et al.

(10) Patent No.: US 8,184,989 B2
(45) Date of Patent: *May 22, 2012

(54) COMMUNICATION SYSTEM AND TIMING CONTROL METHOD

(75) Inventors: Wakako Maeda, Tokyo (JP); Akio Tajima, Tokyo (JP); Akihiro Tanaka, Tokyo (JP); Seigo Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 718 days.

This patent is subject to a terminal disclaimer.

(21) Appl. No.: 11/471,876

(22) Filed: Jun. 21, 2006

(65) Prior Publication Data

US 2007/0110454 A1    May 17, 2007

(30) Foreign Application Priority Data

Jun. 21, 2005  (JP) ................................. 2005-180478
Mar. 31, 2006  (JP) ................................. 2006-098655

(51) Int. Cl.
*H04B 10/04* (2006.01)

(52) U.S. Cl. ........ 398/188; 398/154; 398/155; 398/192; 398/195; 380/278; 380/256; 380/283; 380/277

(58) Field of Classification Search .................. 398/188, 398/183, 154, 155, 158, 159, 33, 38, 156, 398/161, 162, 163, 192, 193, 194, 195, 196, 398/197, 198, 202, 208, 209, 213, 214, 79, 398/25, 26, 27, 30, 31, 32; 380/256, 278, 380/277, 255, 283, 263, 280, 273

See application file for complete search history.

(56) References Cited

U.S. PATENT DOCUMENTS

| | | | | |
|---|---|---|---|---|
| 5,307,410 A | * | 4/1994 | Bennett | 380/256 |
| 5,768,378 A | * | 6/1998 | Townsend et al. | 380/256 |
| 2003/0231771 A1 | | 12/2003 | Gisin et al. | |

(Continued)

FOREIGN PATENT DOCUMENTS

JP    H08-505019    5/1996

OTHER PUBLICATIONS

Maeda W. et al., "High-Speed QKD System Synchronized by Automatic Phase-Alignment Mechanism", Optical Fiber Communication Conference, 2005. Technical Digest. OFC/NFOEC Anaheim, CA, pp. 212-214.

(Continued)

*Primary Examiner* — Hanh Phan

(74) *Attorney, Agent, or Firm* — Scully, Scott, Murphy & Presser, P.C.

(57) ABSTRACT

A communication system and a timing control method are proposed that optimize timing in a sender and thereby enable information to be stably transmitted at the right timing. Under instructions from a timing controller in a receiver, the timing of driving a phase modulator in a sender is shifted by one step after another, and the then amount of clock shift and result of interference are monitored at the receiver and stored in a memory. The optimum timing is determined based on the stored data. Thus, a clock for driving the phase modulator in the sender can be set at the right timing. This is equivalent to compensating for group velocity dispersion due to wavelength dispersion that occurs when an optical signal channel and a clock signal channel are transmitted by wavelength division multiplexing transmission.

44 Claims, 22 Drawing Sheets

U.S. PATENT DOCUMENTS

2005/0078827 A1* 4/2005 Tajima .................. 380/256
2007/0098402 A1* 5/2007 Maeda et al. ............. 398/38

OTHER PUBLICATIONS

Donald S. Bethune et al., "An Autocompensating Fiber-Optic Quantum Cryptography System Based on Polarization Splitting of Light", IEEE Journal of Quantum Electronics, IEEE Service Center, Piscataway, NJ, vol. 36, No. 3, Mar. 2000.

Bennett, Charles H., et al. "Quantum Cryptography: Public Key Distribution and Coin Tossing," IEEE International Conference on Computers, Systems and Signal Processing, Bangalore, India, Dec. 10, 1984, pp. 175-179.

Ribordy, G.. et al., "Automated 'plug & play' quantum key distribution," Electronics Letters, vol. 34, No. 22, Oct. 29, 1998, pp. 2116-2117.

* cited by examiner

FIG. 6
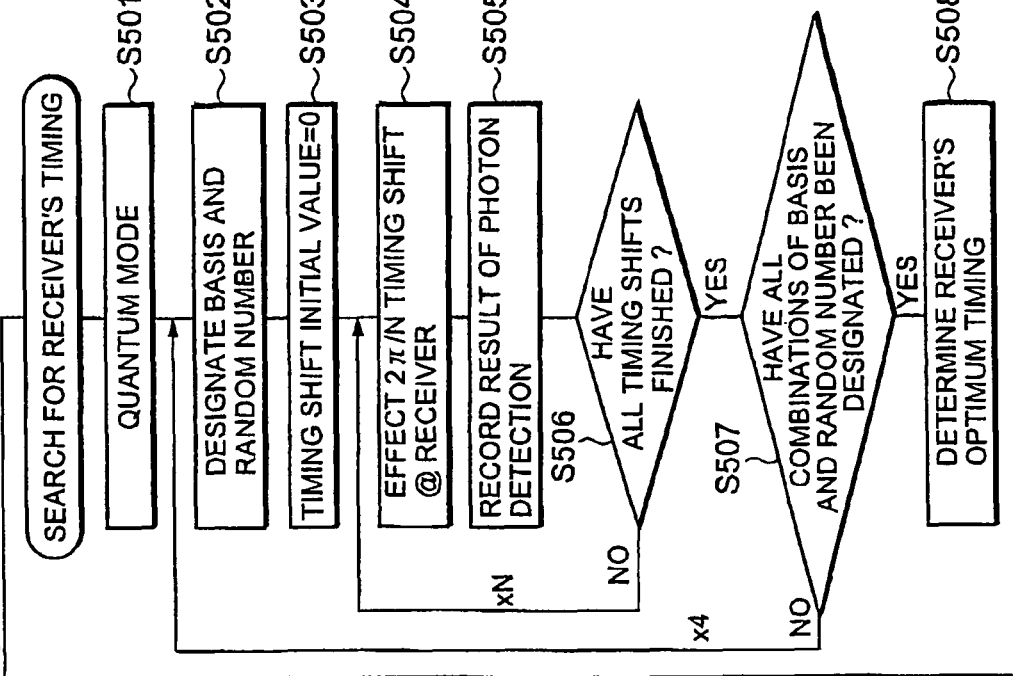
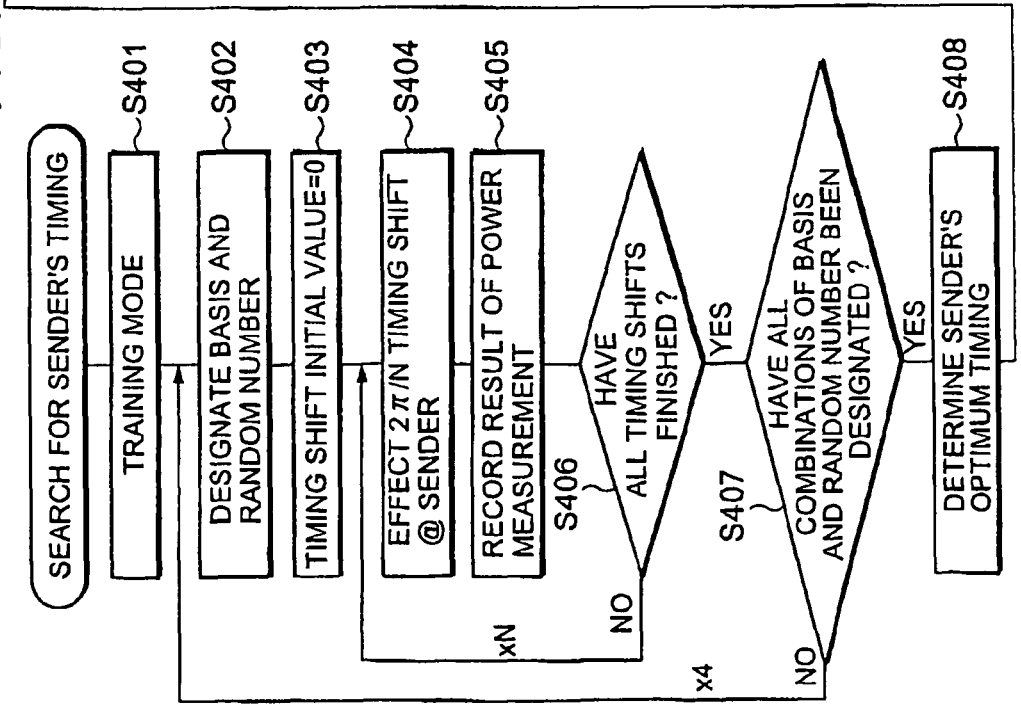

FIG. 13

| CLOCK SHIFT<br>APD POWER RATIO | 1 | 2 | 3 | ... | i | ... | N |
|---|---|---|---|---|---|---|---|
| APD0/APD1<br>(BASIS +, RANDOM NUMBER 0) | A1 | A2 | A3 | ... | Ai | ... | AN |
| APD1/APD0<br>(BASIS +, RANDOM NUMBER 1) | B1 | B2 | B3 | ... | Bi | ... | BN |
| APD0/APD1<br>(BASIS X, RANDOM NUMBER 0) | C1 | C2 | C3 | ... | Ci | ... | CN |
| APD1/APD0<br>(BASIS X, RANDOM NUMBER 1) | D1 | D2 | D3 | ... | Di | ... | DN |
| Ei=Ai * Bi * Ci * Di (i=1~N) | E1 | E2 | E3 | ... | Ei | ... | EN |

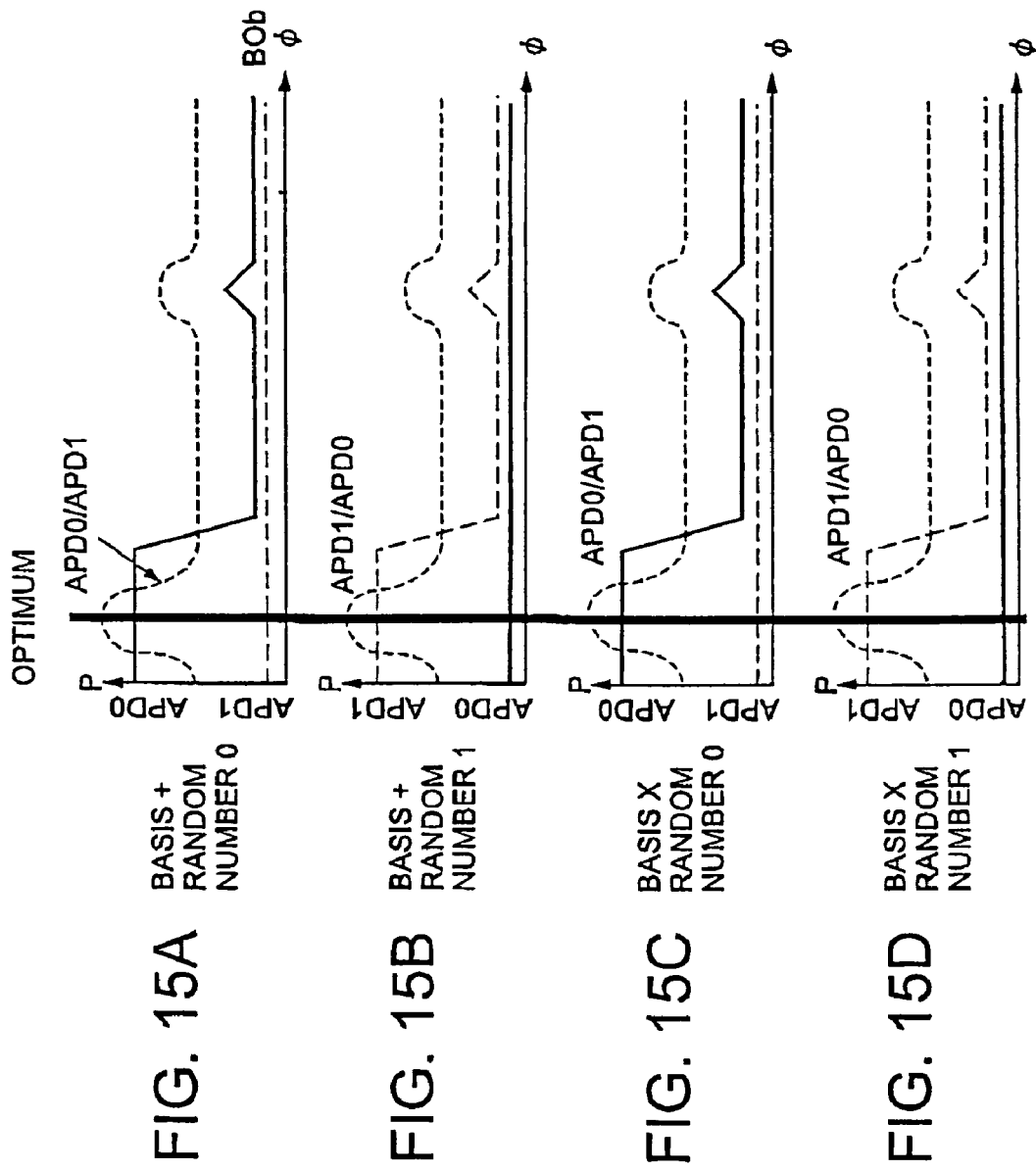

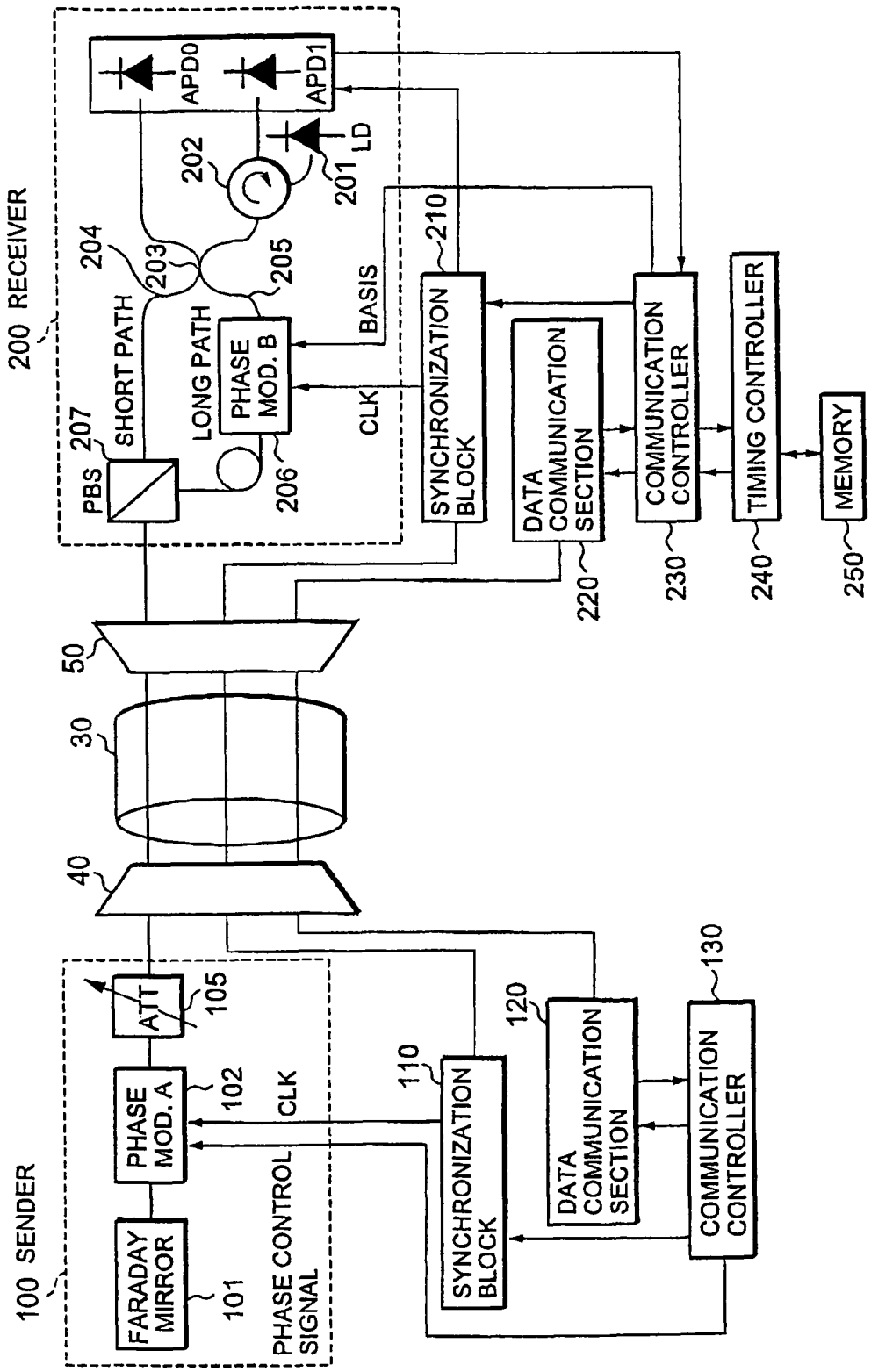

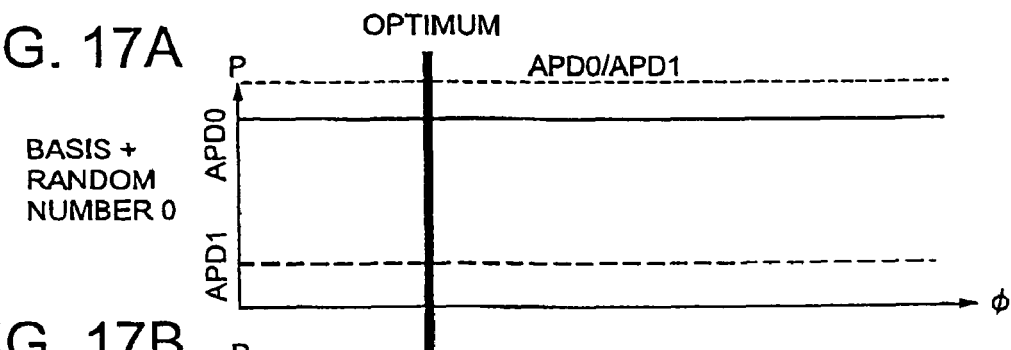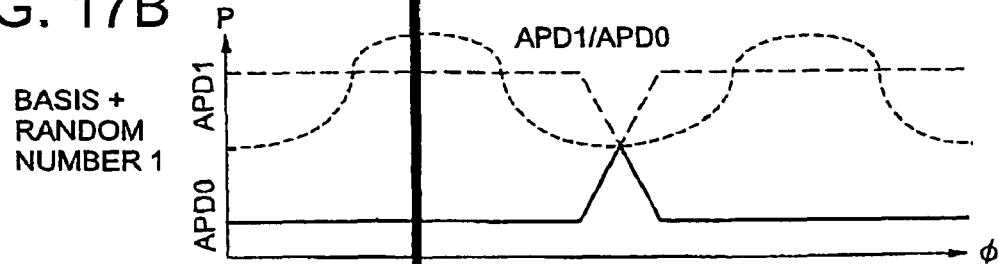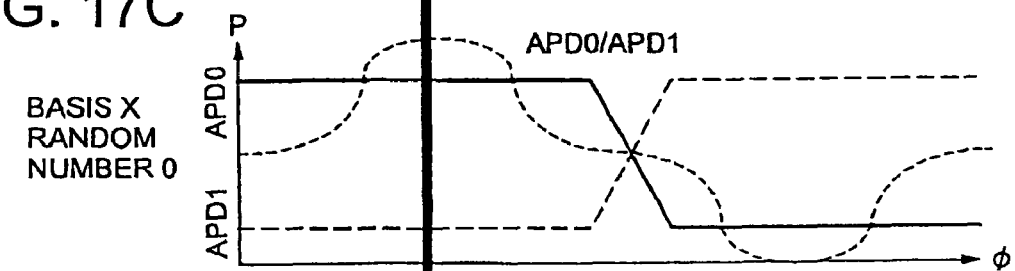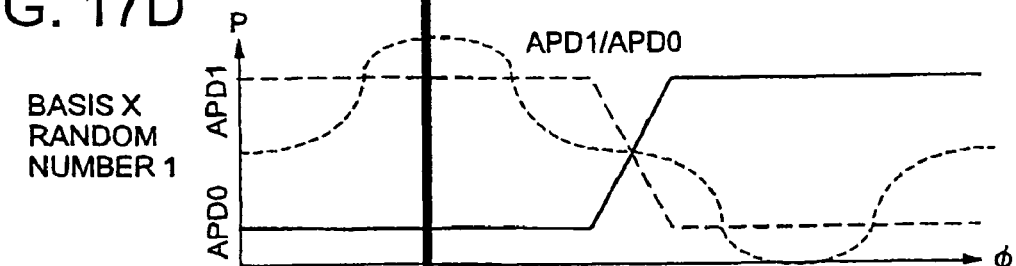

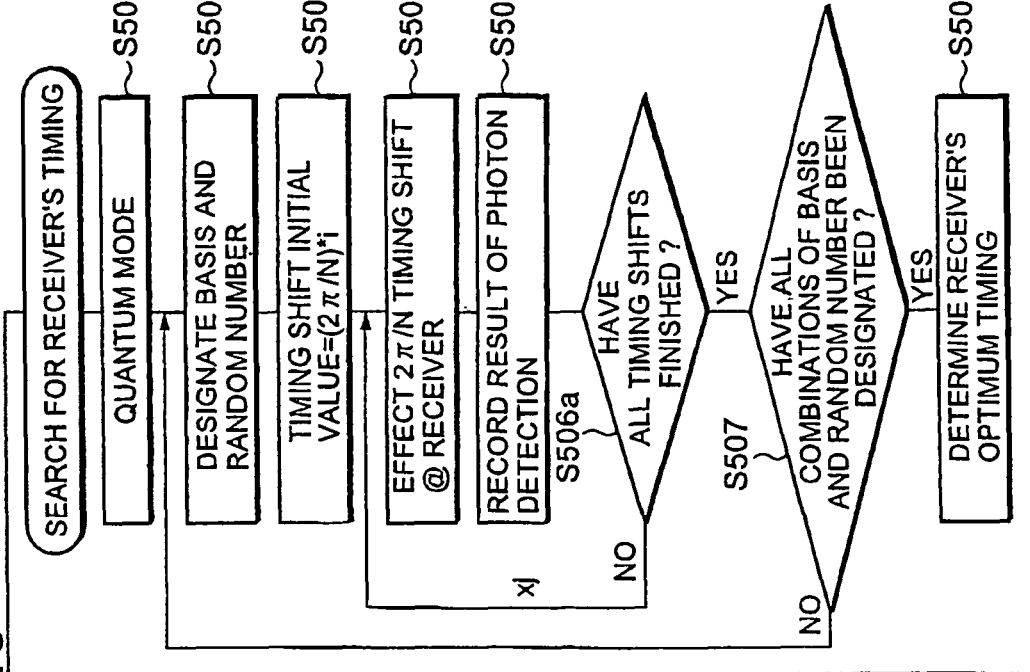
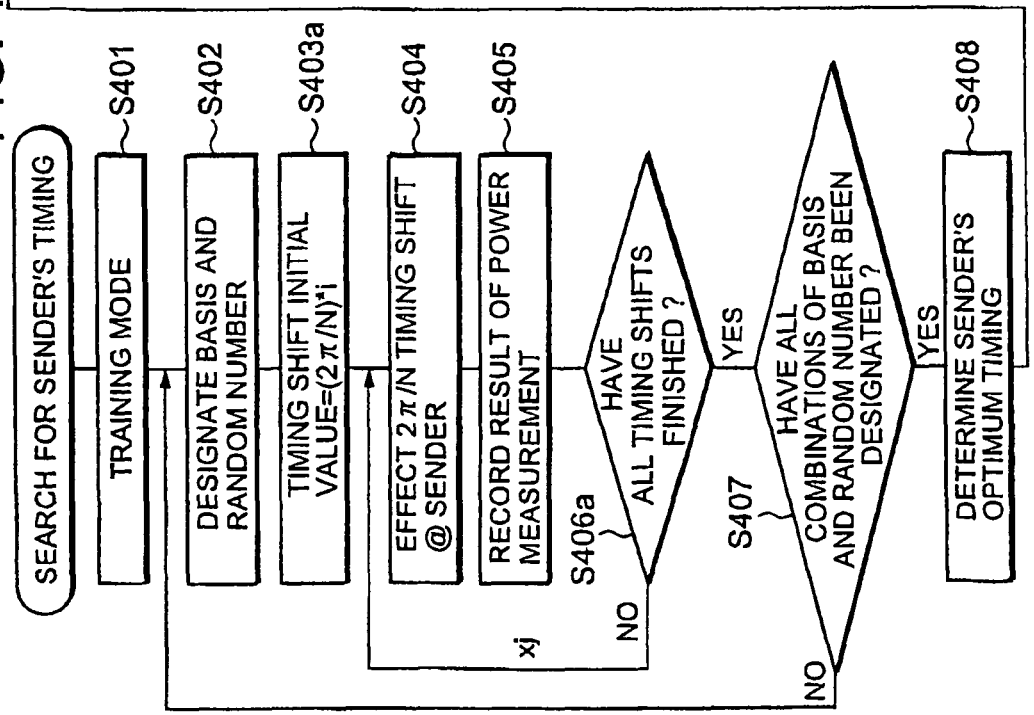
FIG. 18

COMMUNICATION SYSTEM AND TIMING CONTROL METHOD

BACKGROUND OF THE INVENTION

1. Field of the Invention

The present invention relates to a communication system and, more particularly, to a system and method for determining the timing of an operation of a communication device.

2. Description of the Related Art

In recent years, in the field of optical communications, active studies have been devoted to quantum key distribution systems, which are expected to achieve high privacy levels over transmission links, and various proposals have been made.

As a basic example, a system for sharing a quantum cryptographic key between a sender and a receiver by using two bases is proposed in Bennett and Brassard, "Quantum Cryptography: Public Key Distribution and Coin Tossing," IEEE International Conference on Computers, Systems and Signal Processing, Bangalore, India, pp. 175-179. According to this proposal, a sender transmits single photons each modulated in phase with four types of information depending on the combinations of two bases (D, R) representing quantum states and two values of random data (0, 1). A receiver receives the single photons one by one by using the bases (D, R) independently of the sender and stores received data. Thereafter, using an ordinary (classical) channel, the sender and receiver check whether or not their respective bases used in transmission and reception match. Thus, the final common secret data is determined from the received data composed only based on the matched bases.

A "plug and play" quantum key distribution system proposed by a group of the University of Geneva, Switzerland (see Rivordy, G., at al., "Automated 'plug & play' quantum key distribution," Electronics Letters, Vol. 34, No. 22, pp. 2116-2117), in particular, is capable of compensating for polarization fluctuations occurring along an optical fiber transmission line and is therefore expected as a promising scheme to put polarization-sensitive quantum key distribution systems into practical use. A schematic configuration of the plug and play system is shown in FIG. 1.

Referring to FIG. 1, in the plug and play system, a receiver, which is one to receive a quantum cryptographic key, is provided with a laser LD, which generates an optical pulse P. The optical pulse P is split into two parts at an optical coupler. One of the two parts, an optical pulse P1, goes along a short path, whereas the other one, an optical pulse P2, travels along a long path. Thus, they are transmitted to a sender as double pulses.

The sender is provided with a Faraday mirror and a phase modulator A. The received optical pulses P1 and P2 are individually reflected by the faraday mirror, whereby each optical pulse is returned to the receiver with its polarization state rotated by 90 degrees. In this event, the phase modulator A phase-modulates the optical pulse P2 when the optical pulse P2 is passing through the phase modulator A, and therefore a phase-modulated optical pulse $P2^{*a}$ is returned to the receiver.

In the receiver, since the polarization state of each of the optical pulses P1 and $P2^{*a}$ received from the sender is rotated by 90 degrees, a polarization beam splitter PBS leads each received pulse into a path that is different from the path the pulse used when it was transmitted. Specifically, the received optical pulse P1 is led into the long path and phase-modulated when it is passing through a phase modulator B. Thus, a phase-modulated optical pulse $P1^{*b}$ arrives at the optical coupler. On the other hand, the optical pulse $P2^{*a}$, phase-modulated at the sender, goes along the short path, which is different from the path at the time of transmission, and arrives at the same optical coupler. Accordingly, the optical pulse $P2^{*a}$, phase-modulated at the sender, and the optical pulse $P1^{*b}$, phase-modulated at the receiver, interfere with each other, and the result of this interference is detected by any one of photon detectors APD0 and APD1. Note that for the photon detectors, avalanche photodiodes are used and driven in the Geiger mode.

As described above, a single optical pulse generated at the receiver is split into two parts, and the resultant optical pulses P1 and P2 make respective round trips between the receiver and sender while individually being phase-modulated in the course. As a whole, the optical pulses P1 and P2 travel along the same optical path and then interfere with each other. Accordingly, delay variations attributable to the optical fiber transmission line are compensated for, and the result of interference observed by the photon detector APD0 or APD1 depends only on the difference between the amount of phase modulation at the sender and the amount of phase modulation at the receiver.

The plug and play system having such a configuration requires synchronization as cited below.

(1) In the sender, it is necessary to apply a voltage corresponding to the amount of phase modulation to the phase modulator A synchronously with the timing when the optical pulse P2 transmitted from the receiver is passing through the phase modulator A.

(2) In the receiver, it is necessary to apply a voltage corresponding to the amount of phase modulation to the phase modulator B synchronously with the timing when the optical pulse P1 reflected from the sender is passing through the phase modulator B.

(3) Further in the receiver, it is necessary to apply a bias to the photon detectors APD0 and APD1 synchronously with the timing of the incidence of the returned optical pulse (superhigh sensitive reception in the gated Geiger mode).

As described above, for a quantum key distribution system to stably generate a quantum cryptographic key by achieving high interference in practice, it is indispensable to perform timing control such that each of the sender-side phase modulator A, receiver-side phase modulator B, and photon detectors APD is driven in synchronization with the timing of the arrival of an optical pulse.

This would not be particularly problematic to ordinary or classical optical communications. However, in a quantum key distribution system, the number of photons per pulse is extremely small: one photon per pulse at most. Therefore, most of data transmitted from a sender is lost due to losses attributable to a transmission line, and little data arrives at a receiver. In addition to this, photons cannot be retimed because the values of arriving data are probabilistically determined. Therefore, employed is a scheme in which, apart from a quantum signal for key distribution, a clock signal, which provides timing information, is exchanged between the sender and receiver to adjust timing.

However, even in the case where the clock signal is exchanged through an optical transmission line, the extension and contraction of the optical transmission line must be taken into account. For example, in the case of an optical fiber over a distance of 20 km, if the environmental temperature rises by 10° C., an extension of 3.2 m occurs. This amount of extension is equivalent to one bit in the case of a system clock of 62.5 MHz.

A deviation in timing between a quantum signal and a synchronization signal due to the extension/contraction of an optical transmission line can be avoided by wavelength-multiplexing the quantum signal and clock signal to allow them to propagate along the same optical transmission line, using the wavelength division multiplexing (WDM) technology.

For example, Japanese Patent Application Unexamined Publication No. H08-505019 proposes a method of calibrating a system as well as bit synchronization by utilizing a classical channel. According to this method, a quantum channel and a classical channel are set on the same transmission line, and the classical channel is used to provide clock synchronization for the quantum channel, whose optical power is weak.

However, when the quantum signal and clock signal are transmitted by wavelength division multiplexing transmission, a propagation delay difference arises because the different-wavelength channels have different group velocity dispersions (GVD). Accordingly, a deviation in timing still occurs between the quantum signal and clock signal. Such a propagation delay difference between channels is a grave problem to solve, for a system that requires synchronization between different-channel signals.

Additionally, in a system that transmits information by utilizing phase modulation, such as a quantum key distribution system as described above, it cannot be determined whether or not the timing of driving a phase modulator in a sender is right, without referring to the result of detection obtained at a receiver. Therefore, even if the phase modulator is driven in accordance with a clock compensated for a propagation delay difference, it cannot be determined whether or not the result of that compensation is appropriate, without checking the result of reception at the receiver.

SUMMARY OF THE INVENTION

Therefore, an object of the present invention is to solve the above-described conventional problems. In particular, an object of the present invention is to provide a communication system and a timing control method that optimize timing in a sender and thereby enable information to be transmitted stably at the right timing.

Moreover, another object of the present invention is to provide an optical communication system that compensates for the group velocity dispersions in the case where an optical signal to be subjected to phase modulation and a clock signal are transmitted by wavelength division multiplexing transmission, and thereby drives the phase modulator at the right timing, thus enabling fast stable distribution of a cryptographic key.

According to an aspect of the present invention, in a communication system between a first communication device and a second communication device using a plurality of communication channels, the first communication device has a modulator for modulating a carrier signal according to transmission information at modulation timing to transmit a modulated signal to the second communication device through a first communication channel. The second communication device has a detector for detecting a signal received through the first communication channel and a timing controller for controlling the modulation timing of the first communication device through a second communication channel based on a detection result of the detector.

The timing controller may monitor the detection result of the detector while shifting the modulation timing along time axis to search for a modulation timing providing a desired detection result of the detector.

Preferably, the second communication device further include a detection timing supplier for supplying a detection timing to the detector, wherein the timing controller controls the detection timing based on the detection result of the detector after having completed control of the modulation timing.

As described above, the modulation timing of the first communication device is controlled by the second communication device and the second communication device can easily optimize its own modulation timing by monitoring the detection results obtained from the controlled modulation timing of the first communication device.

It is possible that the second communication device further includes a modulation controller for adjusting a depth of modulation of the modulator based on the detection result of the detector through the second communication channel. For example, the modulator is a phase modulator which provides a phase difference to the carrier signal depending on a modulation control voltage applied to the phase modulator, wherein the modulation timing is a time period during which the carrier signal passes through the phase modulator. Further, the timing controller may monitor the detection result of the detector while shifting in time a time period during which the modulation control voltage is applied to the phase modulator to search for an application timing of the modulation control voltage at which a desired detection result is obtained.

According to the present invention, an optical communication system can be provided as follows. The first communication device includes: a phase modulator for modulating an optical signal in phase according to a phase control signal corresponding to transmission information at modulation timing to transmit a phase-modulated optical signal to the second communication device through a first communication channel; and a first controller for controlling the phase modulator based on control signals received from the second communication device through a second communication channel. The second communication device includes: a detector for detecting the transmission information by optical interference of an optical signal received from the first communication device through the first communication channel; and a second controller for transmitting a modulation timing control signal to the first communication device through the second communication channel, wherein the modulation timing control signal is a control signal for controlling the modulation timing of the first communication device based on a detection result of the detector.

The second controller may sequentially transmit the modulation timing control signal to the first communication device so as to shift in time a time period during which the phase control signal is applied to the phase modulator, wherein every time the time period is shifted, the second controller records a detection result of the detector varying due to the optical interference into a memory. The second controller may determine an application time period of the phase control signal from an amount of shift providing a desired detection result of the detector, based on a change in detection result depending on an amount of shift recorded in the memory.

Preferably, the phase control signal have a plurality of values, wherein for each of the plurality of values of the phase control signal, the second controller sequentially transmits the modulation timing control signal to the first communication device so as to shift in time a time period during which the value of the phase control signal is applied to the phase modulator, wherein every time the time period is shifted, the second controller records a detection result of the detector varying due to the optical interference into a memory for each of the plurality of values of the phase control signal. The second controller may determine an application time period of the phase control signal from an amount of shift providing a desired detection result of the detector for each of the plurality of values of the phase control signal, based on a change in detection result depending on an amount of shift recorded in the memory for each of the plurality of values of the phase control signal.

According to another aspect of the present invention, a timing control method is provided in transmission of information between a sender and a receiver using a plurality of communication channels. The sender modulates a carrier signal according to transmission information at modulation timing to transmit a modulated signal to the receiver through a first communication channel. The receiver detects a signal received from the sender through the first communication channel; and transmits a timing control signal to the sender through a second communication channel to control the modulation timing of the sender based on a detection result of the signal received from the sender. Then the sender, when receiving the timing control signal from the receiver through the second communication channel, changes the modulation timing according to the timing control signal.

According to further another aspect of the present invention, the shift range of modulation timing is searched roughly to determine a large modulation timing region, which is used as an initial shift range to perform a close search to determine final modulation timing.

As described above, according to the present invention, the modulation timing of the first communication device is controlled by the second communication device and the second communication device can easily optimize its own modulation timing by monitoring the detection results obtained from the controlled modulation timing of the first communication device.

According to an embodiment of the present invention, the phase modulation timing of a transmitted is shifted by one step under control of a receiver and, every time one step is shifted, the receiver stores the detection result obtained from the received phase-modulated signal. Based on the stored detection result data, the receiver can determine the optimal timing of phase modulation of the sender. Accordingly, the receiver can confirm that the phase modulation timing of the sender is right, allowing the driving timing of a photon detector at the receiver to precisely coincide with the photon incident timing. This means that group velocity dispersions (GVD) due to wavelength-division multiplexing of phase-modulated optical signal and a clock signal can be compensated for. In other words, the phase modulator can be driven at stable modulation timing, resulting in desired phase modulation of an optical carrier signal.

In addition, an optical communication system according to the present invention can achieve stable phase modulation and photon detection. Accordingly, in the case of the present invention applied to a quantum key distribution system, it can compensate for timing difference between an optical signal and a clock signal due to wavelength distribution in the case where the optical signal to be subjected to phase modulation and the clock signal are transmitted by wavelength division multiplexing transmission, and thereby drives the phase modulator at the right timing, thus enabling fast stable distribution of a cryptographic key.

BRIEF DESCRIPTION OF THE DRAWINGS

FIG. 6 is a flowchart showing a timing control procedure according to the first embodiment of the present invention.

FIG. 13 is a diagram schematically showing a data table of amounts of clock shift and data on optical powers observed by APD0 and APD1, which is stored in a memory 250.

FIGS. 15A to 15D are graphs schematically showing variations in the power detected at the receiver, with respect to the four combinations of a basis and a random number, respectively.

FIG. 16 is a block diagram showing a configuration of a quantum key distribution system according to a second embodiment of the present invention.

FIGS. 17A to 17D are graphs schematically showing variations in the average power measured at the receiver, with respect to the four combinations of a basis and a random number, respectively.

FIG. 18 is a flowchart showing a timing control sequence according to a third embodiment of the present invention.

DETAILED DESCRIPTION OF THE PREFERRED EMBODIMENTS (First Mode)

Figure 2:
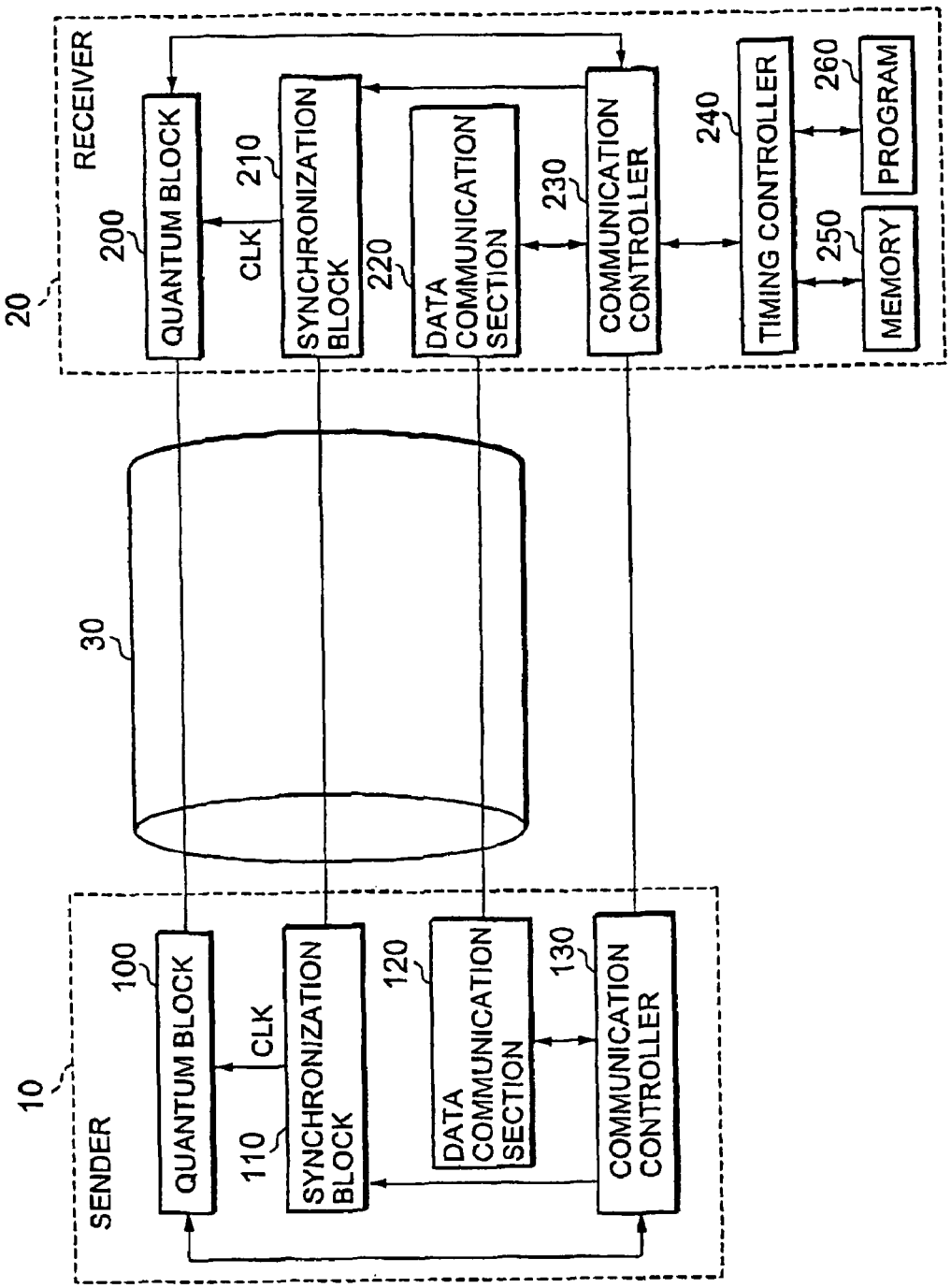
FIG. 2 is a block diagram showing a configuration of an optical communication system according to a first mode for carrying out the present invention.

FIG. 2 is a block diagram showing a configuration of an optical communication system according to a first mode for carrying out the present invention. By way of example, shown here is a system configuration in which two communication devices are optically connected through an optical transmission line 30. Of the two communication devices, one on the sending side of quantum communication is referred to as a sender 10, and the other on the receiving side is referred to as a receiver 20.

The sender 10 is provided with a quantum block 100, which includes modulation means for modulating an optical signal in accordance with original information for transmission and operates in accordance with a clock signal CLK supplied from a synchronization block 110. Moreover, the sender 10 is also provided with a data communication section 120 and a communication controller 130. Through the data communication section 120, the sender 10 exchanges control signals with the receiver 20. The communication controller 130 controls the quantum block 100 and synchronization block 110 in accordance with control signals from the receiver 20.

The receiver 20 is provided with a quantum block 20, which includes detection means for detecting an incident optical signal from the sender 10 and operates in accordance with a clock signal CLK supplied from a synchronization block 210. Moreover, the receiver 20 is also provided with a data communication section 220 that exchanges control signals with the sender 10, and a communication controller 230 that controls the quantum block 200 and synchronization block 210.

The receiver 20 is further provided with a timing controller 240 that controls the communication controller 230 to optimize timing in the sender 10 and timing in the receiver 20. To the timing controller 240, connected are a memory 250 that stores measurement data used for determining the optimum timings and a program memory 260 that stores a timing control program. Incidentally, the wavelength division multiplexing is used to transmit a clock signal and a quantum signal. The synchronization block 110 provided for the sender 10 and the synchronization block 210 provided for the receiver 20 performs transmission of the clock signal at a wavelength different from that of the quantum signal. The synchronization blocks 110 and 210 each have a wavelength stabilized laser as a light source for transmitting the clock signal and supply the stable clock signals CLK to the quantum blocks 100 and 200, respectively.

In the sender 10, the synchronization block 110 supplies the clock signal CLK to the quantum block 100, thereby determining the timing of optical modulation for quantum communication. Here, the synchronization block 110 can shift the phase of this clock signal in accordance with an instruction from the receiver 20. It is thus possible to move the timing of optical modulation along the time axis.

In the receiver 20 as well, the synchronization block 210 supplies the clock signal CLK to the quantum block 200, thereby determining the timing of detection for quantum communication (specifically, the timing of optical modulation and the timing of optical detection). Similarly, the synchronization block 210 can shift the phase of this clock signal under the control of the timing controller 240. It is thus possible to move those timings along the time axis.

According to the present invention, it is possible to optimize the timing of optical modulation in the sender 10 and the timing of detection in the receiver 20 in accordance with instructions from the timing controller 240 in the receiver 20, which will be discussed later. The timing controller 240 can be implemented by a program-controlled processor executing the timing control program stored in the program memory 260.

1. First Embodiment

Figure 3:
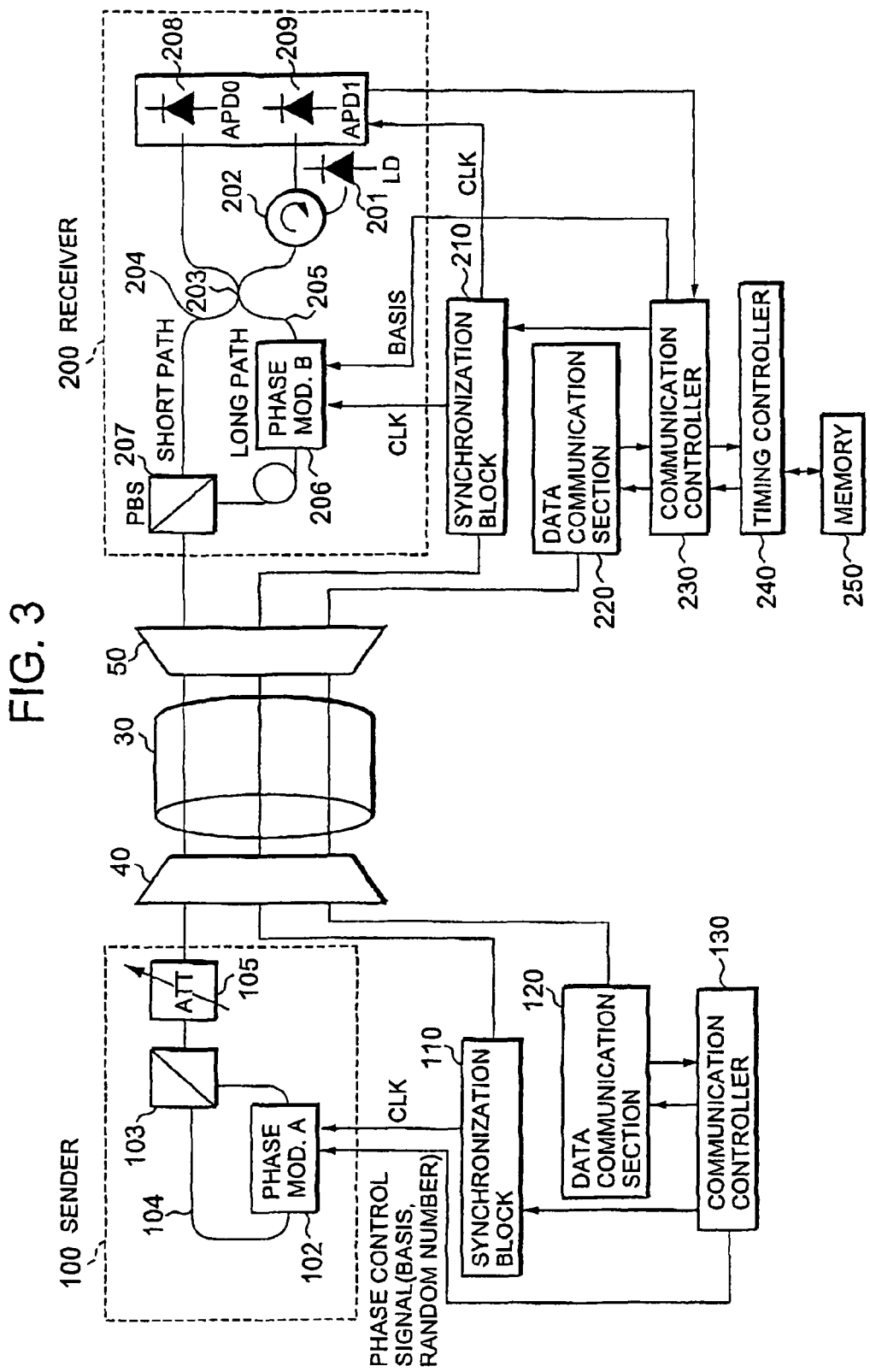
FIG. 3 is a block diagram showing a configuration of a temperature-independent plug and play system according to a first embodiment of the present invention.

FIG. 3 is a block diagram showing a configuration of a temperature-independent plug and play system according to a first embodiment of the present invention. Note that blocks similar to those shown in FIG. 2 are given the same reference numerals and symbols as in FIG. 2. The basic configuration and operation of the plug and play system according to the present embodiment are as described in conjunction with FIG. 1, except that a PBS loop is employed in place of the faraday mirror in the sender.

The quantum block 100 in the sender 10 (here, Alice) has a PBS loop 104 and a variable optical attenuator 105. The PBS loop 104 includes a phase modulator 102 and a polarization beam splitter (PBS) 103.

The phase modulator 102 performs phase modulation on a sequence of optical pulses passing through itself, in accordance with a clock signal CLK supplied from the synchronization block 110. The depth of a phase modulation is determined by a phase control signal given from the communication controller 130. Here, there are four modulation depths, $(0, \pi/2, \pi, 3\pi/2)$, corresponding to four combinations of a basis (+/x) and a random number (0/1). The phase control signal is a voltage corresponding to any one of the modulation depths. The phase control signal is applied to the phase modulator 102 at the timing when an optical pulse is passing through the phase modulator 102, whereby phase modulation of the optical pulse is performed.

The PBS loop 104 has a function similar to a faraday mirror, by which incident light is output with its polarization state rotated by 90 degrees. The PBS loop of the present embodiment will be discussed later.

Figure 1:
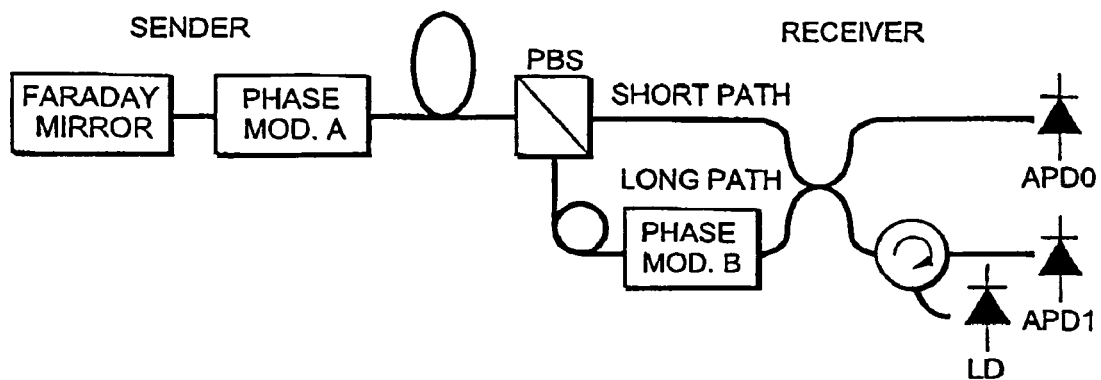
FIG. 1 is a block diagram showing a schematic configuration of a plug and play system.

The configuration of the quantum block 200 in the receiver 20 (here, Bob) is basically the same as the configuration shown in FIG. 1. An optical pulse P, generated by a laser 201 in accordance with a clock signal supplied from the synchronization block 210, is led by an optical circulator 202 into an optical coupler 203, where the optical pulse P is split into two parts. One of the two parts, an optical pulse P1, goes along a short path 204 and is sent to a polarization beam splitter (PBS) 207. The other one of the two parts, an optical pulse P2, travels along a long path 205, passes through a phase modulator 206 provided on the long path 205, and is sent to the PBS 207. These optical pulses P1 and P2 are combined at the PBS 207 and then transmitted to the sender 10 as double pulses, after passing through a wavelength multiplexing/demultiplexing filter 50 and the optical transmission line 30. Note that the short path 204 and long path 205 are composed of polarization maintaining fiber, and the optical circulator 202 and optical coupler 203 are of polarization maintaining types. Moreover, a clock signal exchanged between the synchronization blocks 110 and 210 is an optical signal having a wavelength different from that of the optical pulses transmitted from the quantum block 100 to the quantum block 200. These signals are wavelength-multiplexed/demultiplexed by the wavelength multiplexing/demultiplexing filters 40 and 50 and are transmitted over the optical transmission line 30 by wavelength division multiplexing transmission.

The sender 10 receives the double pulses P1 and P2 from the receiver 20 through the transmission line 30. The double pulses P1 and P2 passing through the wavelength multiplexing/demultiplexing filter 40 and variable optical attenuator 105 are each further split at the PBS 103, resulting in four pulses (i.e., quartet pulses) including double pulses P1cw and P2cw traveling clockwise and double pulses P1 ccw and P2 ccw traveling counterclockwise. The clockwise double pulses P1cw and P2cw and counterclockwise double pulses P1ccw and P2ccw pass through the phase modulator 102 in the opposite directions to each other, and then each pair enters a PBS port different from the port from which they were output.

The phase modulator 102 phase-modulates the pulse P2cw, which is the following one of the clockwise double pulses, with respect to the preceding pulse P1cw and also provides a phase difference of π between the clockwise double pulses and the counterclockwise double pulses, which will be discussed later. The phase modulator 102 requires timing control such that an arbitrary phase modulation is performed on each of the quartet pulses as described above.

The quartet pulses thus phase-modulated as required are combined at the PBS 103, returning to the double pulses. As described above, since only the subsequent pulse P2wc has been phase-modulated based on transmission information, the output double pulses are denoted by P1 and P2*$^a$. At this point, the polarization has been rotated by 90 degrees when each pulse is output, with respect to when it was input to the PBS loop. Therefore, as a result, an effect similar to the faraday mirror can be achieved.

In the receiver 20, since the polarization states of the optical pulses P1 and P2*$^a$ received from the sender 10 have been rotated by 90 degrees, the polarization beam splitter PBS 207 leads each of these received pulses into a path different from the path through which the pulse propagated at the time of transmission. More specifically, the received optical pulse P1 goes along the long path. The optical pulse P1 is phase-modulated with a designated basis when it is passing through the phase modulator 206, and a phase-modulated optical pulse P1*$^b$ arrives at the optical coupler 203. On the other hand, the optical pulse P2*$^a$ travels along the short path, which is different from the path at the time of transmission, and then arrives at the same optical coupler 203.

Thus, the optical pulse P2*$^a$, phase-modulated on the sender side, and the optical pulse P1*$^b$, phase-modulated on the receiver side, interfere with each other, and the result of this interference is detected by a photon detector APD0 or APD1. The photon detectors APD0 and APD1 are driven in the gated Geiger mode in accordance with a clock signal CLK supplied from the synchronization block 210, and a detection signal is output to the communication controller 230. The timing controller 240 accumulates in the memory 250 detection data detected by the photon detectors APD0 and APD1 in a timing control sequence, and uses the accumulated detection data to determine the optimum timing, which will be discussed later.

1.1) Phase Modulation in PBS Loop

Hereinafter, operation of the PBS loop will be described.

Figure 4:
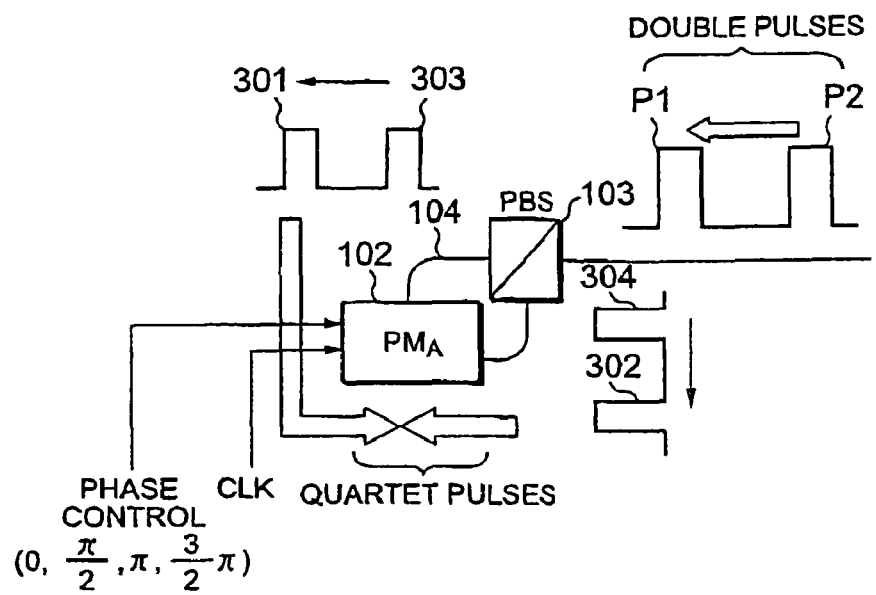
FIG. 4 is a schematic diagram for explaining operation of a PBS loop in a sender.

FIG. 4 is a schematic diagram for explaining operation of the PBS loop 104 in the sender 10. As described above, each of the input double pulses P1 and P2 is split at the PBS 103 into polarization components perpendicular to each other, resulting in quartet pulses 301 to 304. The optical pulses 301 and 302 correspond to one polarization component of the optical pulse P1 and the other polarization component perpendicular to it, respectively. The optical pulses 303 and 304 correspond to one polarization component of the optical pulse P2 and the other polarization component perpendicular to it, respectively.

The PBS 103 has two loop-side ports, which are respectively connected to two optical ports of the phase modulator 102 through polarization-maintaining optical fiber. However, the lengths of optical paths between the ports are different. Here, it is assumed that the lengths of the optical paths are set so that the optical pulses 301 and 303 enter the phase modulator 102 earlier than the optical pulses 302 and 304, respectively, each by time T. This time difference T is set so as to be longer than the width of an optical pulse and shorter than the interval between the optical pulses P1 and P2.

Figure 5:
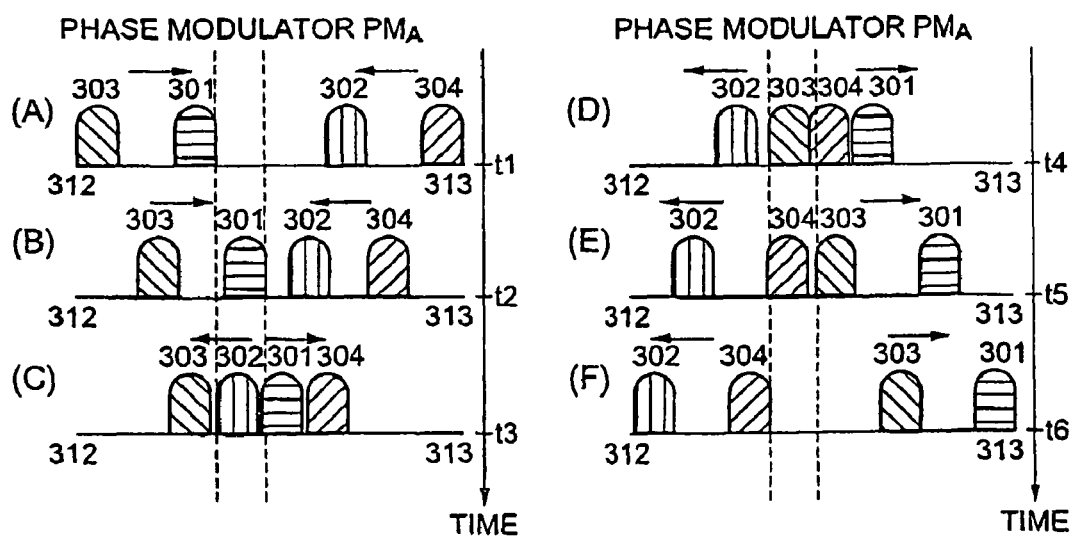
FIG. 5 is an explanatory diagram showing a time sequence of optical pulses propagating along the PBS loop.

FIG. 5 is an explanatory diagram showing a time sequence of the optical pulses propagating along the PBS loop. Since the optical pulses 301 and 303 arrive at the phase modulator 102 earlier than the optical pulses 302 and 304 respectively each by time T, the individual optical pulses pass through the phase modulator 102 at different times t1 to t6 as shown at (A) to (F) in FIG. 5. Accordingly, by changing the voltage to be applied to the phase modulator 102 in synchronization with the pulse intervals, different phase differences can be given between each optical pulse. Here, the phase differences to be given between each optical pulse are set as shown in Table 1.

TABLE 1

| Basis, RN | Phase of Optical Pulse 301 | Phase of Optical Pulse 302 | Phase of Optical Pulse 303 | Phase of Optical Pulse 304 |
|---|---|---|---|---|
| +, 0 | 0 | π | 0 | π |
| +, 1 | 0 | π | π | 0 |
| ×, 0 | 0 | π | π/2 | 3π/2 |
| ×, 1 | 0 | π | 3π/2 | π/2 |

As shown in Table 1, a phase difference of 0 is given between the optical pulses 301 and 303 in the case of the basis "+" and the random number (RN) "0"; a phase difference of π is given between the optical pulses 301 and 303 in the case of the basis "+" and the random number "1"; a phase difference of π/2 is given between the optical pulses 301 and 303 in the case of the basis "×" and the random number "0"; a phase difference of 3π/2 is given between the optical pulses 301 and 303 in the case of the basis "×" and the random number "1". Moreover, the same phase differences as those between the optical pulses 301 and 303 are given between the optical pulses 302 and 304. At the same time, a phase difference of π is given between the optical pulses 301 and 302, and also between the optical pulses 303 and 304.

As described above, in the quantum key distribution system, an arbitrary phase modulation needs to be performed on each pulse of the double pulses or quartet pulses. In other words, to each of the phase modulators 102 and 206 that control the phase with voltage, a voltage for giving a required modulation needs to be applied at the timing when each pulse is passing through the phase modulator. Unless the phase modulator is driven at the right timing, a wrong pulse will be modulated. Accordingly, it is necessary to control the timings of the clocks for driving the phase modulators 102 and 206 and to check whether or not the timings are right. Hereinafter, a timing control procedure according to the present embodiment will be described in detail.

1.2) Timing Control Procedure

FIG. 6 is a flowchart showing a timing control procedure according to the first embodiment of the present invention. Control of timing according to the present embodiment is first performed for the sender 10 and then performed for the receiver 20. Control of timing in the sender 10 is all performed under instructions from the timing controller 240 in the receiver 20.

Referring to FIG. 6, first, the timing controller 240 sets the receiver 20 in a training mode. In the training mode, the photon detectors APD0 and APD1 operate with a fixed bias, not in the gated Geiger mode, and measure the average optical power. Subsequently, the timing controller 240 controls the communication controller 230 so that a mode change signal for changing to the training mode is transmitted to the sender 10 from the data communication section 220. With this signal, the communication controller 130 in the sender 10 causes the variable optical attenuator 105 to reduce the amount of loss and thereby increases the output optical power to an ordinary communication level (S401). Accordingly, double pulses of ordinary optical power are transmitted from the receiver 20 to the sender 10 and then returned from the sender 10 to the receiver 20 as described above.

When the sender 10 has been set into the training mode, the timing controller 240 controls the communication controller 230 so that one of the four combinations of a basis and a random number is selected, that the selected basis is set on the phase modulator 206 in the receiver 20, and that the selected basis and random number are notified for designation to the communication controller 130 in the sender 10 (S402). With this designation, the communication controller 130 outputs phase control signals to the phase modulator 102 and thereby sets the phase modulator 102 to modulation depths (phases) corresponding to a combination of the selected basis and random number.

Next, the timing controller 240 instructs the communication controller 130 in the sender 10 to reset the timing shift of a voltage applied to the phase modulator 102 in the sender 10 (S403). With this instruction, the synchronization block 110 resets the amount of shift of the clock signal CLK to an initial value of 0.

When the timing shift is initialized, the timing controller 240 instructs the communication controller 130 to shift the timing, whereby the synchronization block 110, using a predetermined integer N, shifts the timing of the voltage applied to the phase modulator 102 by $2\pi/N$, and the voltage for the set phase modulation is applied at that timing (S404). Thus, each passing pulse of the quartet pulses is modulated as described above and then returned to the receiver 20 in the form of the double pulses.

In the receiver 20, the leading one of the received double pulses is modulated by the phase modular 206 using the designated basis as described above and then the modulated-by-sender pulse and the modulated-by-receiver pulse interfere with each other at the optical coupler 203. The optical powers are measured by APD0 and APD1, and the measurement values are recorded in the memory 250 (S405). This will be discussed in more detail later.

The timing controller 240 repeats the above-described steps S404 and S405 until measurement has been made for all the voltage application timings, while shifting the timings of voltage application to the phase modulator 102 by $2\pi/N$ each time. The measurement values of the received optical powers, obtained for the selected basis and random number, are recorded (S406).

The timing controller 240 performs the above-described steps S402 to S406 for every one of the four combinations of a basis and a random number (S407). When measurement is completed for all the four combinations of a basis and a random number (S407: YES), the timing controller 240 determines the sender's optimum timing based on the results of measurement by APD0 and APD1 recorded in the memory 250, and notifies this optimum timing to the communication controller 130 in the sender 10, whereby the optimum timing is set on the synchronization block 110 (S408). A method of determining the optimum timing will be discussed later.

After the sender's optimum timing is determined in this manner, a timing search is started for the receiver 20. The reason for first performing timing adjustment for the sender 10 is that if modulation is not performed at the optimum timing in the sender, no interference occurs in the receiver with the result that no photon is output to the photon detectors APD0 and APD1, and consequently the receiver's detection timing cannot be found either.

In a search for the receiver's timing, first, the timing controller 240 sets the receiver 20 in a quantum mode, thereby allowing the photon detectors APD0 and APD1 to operate in the gated Geiger mode. Moreover, the timing controller 240 controls the communication controller 230 so that a mode change signal for changing to the quantum mode is transmitted to the sender 10 from the data communication section 220. With this signal, the communication controller 130 in the sender 10 causes the variable optical attenuator 105 to increase the amount of loss and thereby reduces the output optical power to a level of one photon per pulse at most (S501). Accordingly, double pulses of ordinary optical power are transmitted from the receiver 20 to the sender 10, and optical pulses of weak power modulated as described above are returned from the sender 10 to the receiver 20.

Upon the setting into the quantum mode, the timing controller 240 controls the communication controller 230 so that one of the four combinations of a basis and a random number is selected, that the selected basis is set on the phase modulator 206 in the receiver 20, and that the selected basis and random number are notified for designation to the communication controller 130 in the sender 10 (S502). With this designation, the communication controller 130 outputs phase control signals to the phase modulator 102 and thereby sets modulation depths (phases) corresponding to a combination of the selected basis and random number. As described above, the timing of driving the phase modulator 102 has been optimized through the above-described process of a search for the sender's timing.

Subsequently, the timing controller 240 controls the synchronization block 210 through the communication controller 230 so that the timing shift for voltage application to the photon detectors APD0 and APD1 is reset (S503). In other words, the synchronization block 210 resets the amount of shift of the clock signal CLK to an initial value of 0.

When the timing shift is initialized, the timing controller 240 controls the synchronization block 210 through the communication controller 230 so that, using the predetermined integer N, the clock signal CLK is shifted by $2\pi/N$. In accordance with this shifted clock signal CLK, reverse bias voltage is applied to the photon detectors APD0 and APD1 (S504). Consequently, the pulse 21 of weak power arriving from the sender 10 is phase-modulated by the phase modulator 206, resulting in the optical pulse $P1*^b$; the result of the interference of this optical pulse $P1*^b$ and the arriving pulse $P2*^a$ is detected by the photon detector APD0 or APD1; the result of this photon detection is recorded in the memory 250 (S505). This will be discussed in more detail later.

The timing controller 240 repeats the above-described steps S504 and S505 until all the voltage application timings have finished, while shifting the timing of voltage application to the photon detectors APD0 and APD1 by $2\pi/N$ each time. The results of photon detection, obtained for the selected basis and random number, are recorded (S506).

The timing controller 240 performs the above-described steps S502 to S506 for every one of the four combinations of a basis and a random number (S507). However, these steps do not have to be carried out for all the four combinations if the undermentioned optimum point can be found. When measurement is completed for the necessary combinations of a basis and a random number (S507: YES), the timing controller 240 determines the receiver's optimum timing, based on the results of photon detection by APD0 and APD1 recorded in the memory 250 (S508). A method of determining the optimum timing will be discussed later.

Hereinafter, more detailed description will be given of the clock timing search according to the present embodiment, with reference to FIGS. 6 to 12 regarding the sender 10 and with reference to FIGS. 13 and 14 regarding the receiver 20.

1.3) Search for Clock Timing in Sender

Figure 7:
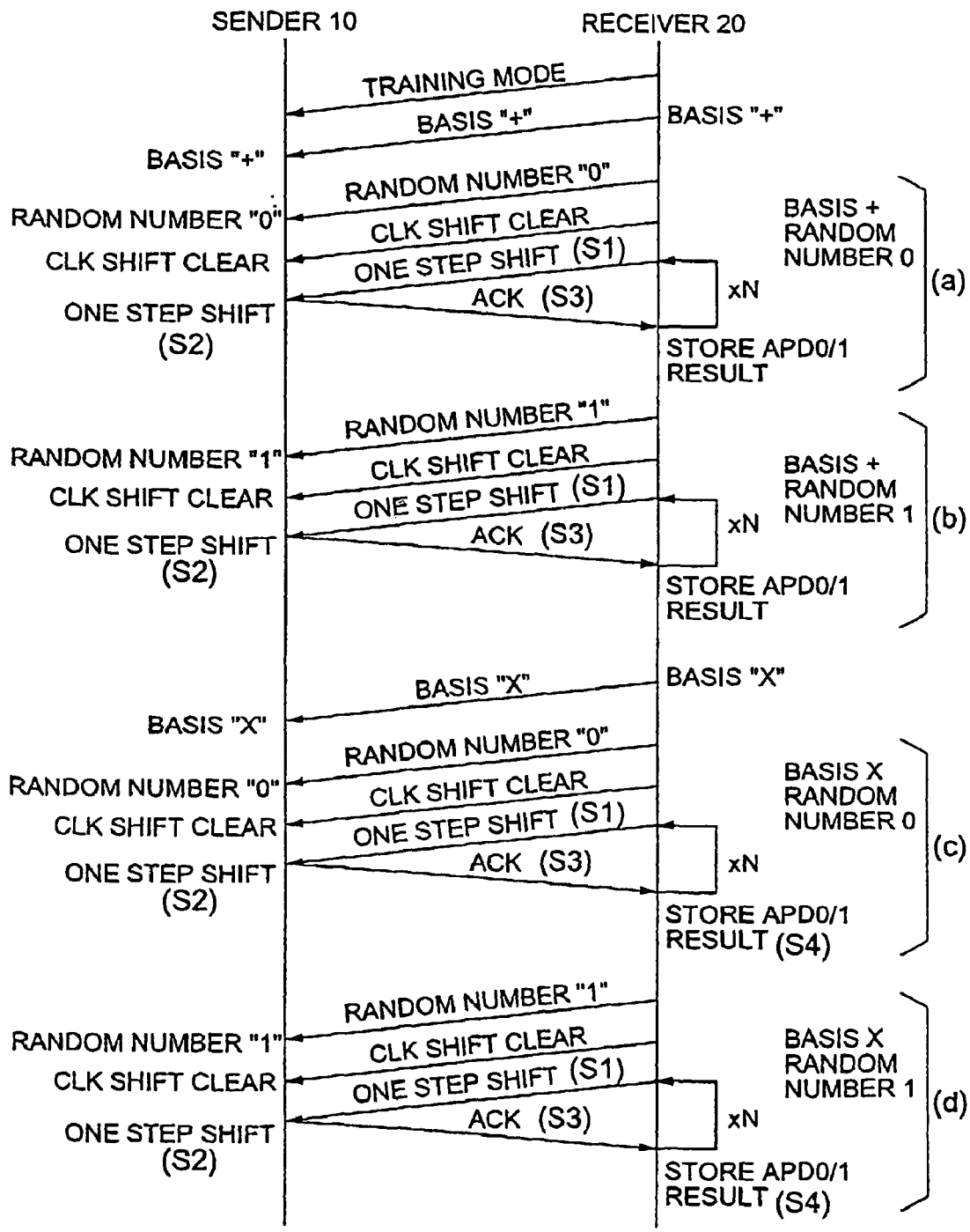
FIG. 7 is a handshake diagram showing a sequence of the control of the sender's timing, with respect to four combinations of a basis and a random number.
Figure 8:
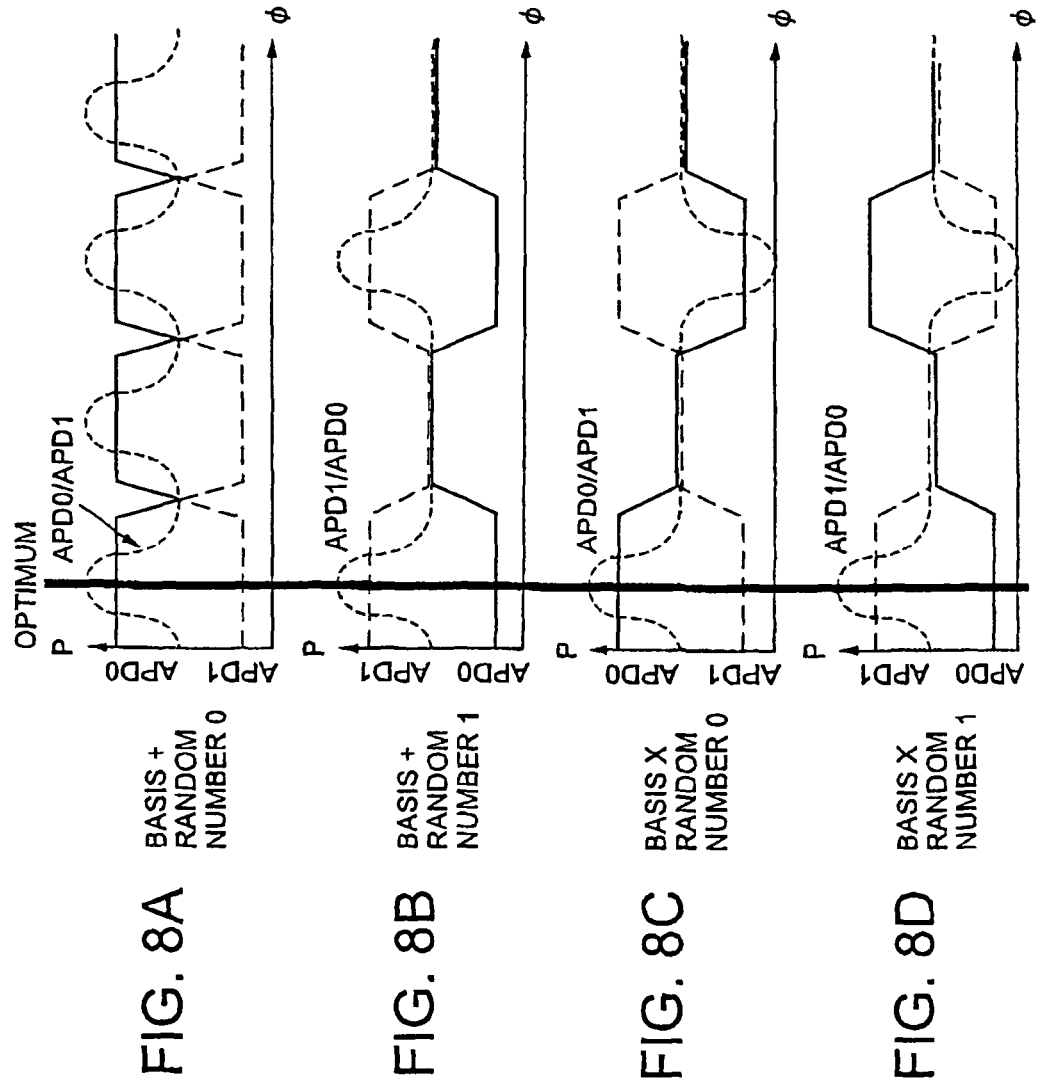
FIGS. 8A to 8D are graphs schematically showing variations in the average power measured at a receiver, with respect to the four combinations of a basis and a random number, respectively.

FIG. 7 is a handshake diagram showing a sequence of the control of the sender's timing, with respect to the four combinations of a basis and a random number. FIGS. 8A to 8D are graphs schematically showing variations in the average power measured at the receiver, for respective ones of the four combinations of a basis and a random number. FIGS. 9 to 12 are diagrams schematically showing the relationship between the timing shift effected at the sender and the measurement result obtained at the receiver, respective ones of the four combinations of a basis and a random number.

a) Basis +, Random Number 0 (0 Modulation)

First, the timing controller 240 in the receiver 20 sets the reception basis of the phase modulator 260 at "+" and further instructs the communication controller 130 in the sender 10 to set the phase modulator 102 at the modulation depth corresponding to a combination of the basis "+" and the random number "0". As a result, as shown in Table 1 mentioned above, the phases for phase modulations to be given to respective ones of the quartet pulses are "0-π-0-π", in the order in which the quartet pulses pass through the phase modulator 102.

The phase modulator 102 in the sender 10 is driven in accordance with the clock signal CLK supplied from the synchronization block 110. Therefore, the timings at which the phase modulator 102 phase-modulates the optical pulses depend on the timing at which the clock is supplied (clock timing). Under instructions from the receiver 20, the synchronization block 110 can shift the clock timing by an arbitrary number of steps ranging from 0 to $2\pi$.

Subsequently, the timing controller 240 issues a CLK-shift clear instruction which instructs the synchronization block 110 in the sender 10 to clear the amount of clock shift to 0. Then, the following steps S1 to S4 are repeated N times until the amount of clock shift reaches $2\pi$, while the clock timing is shifted by $2\pi/N$ each time.

Step S1: The timing controller 240 in the receiver 20 instructs the communication controller 130 in the sender 10 to shift the clock CLK of the synchronization block 110 by one step.

Step S2: The communication controller 130 in the sender 10 causes the synchronization block 110 to shift the clock by one step. Thus, the timings of driving the phase modulator 102 in the sender 10 are shifted by one step.

Step S3: With the above-mentioned one-step shift effected in the sender 10, the optical powers observed by the photon detectors APD0 and APD1 in the receiver 20 are each changed.

Step S4: The observation values obtained by APD0 and APD1 are stored in the memory 250. Note that since light should be output to APD0 when the random number "0" is transmitted, which will be discussed later, the extinction ratio is expressed by the ratio of the observation value obtained by APD0 to the observation value obtained by APD1 (APD0/APD1).

FIG. 8A shows variations of the observation values with the amount of timing shift φ, thus stored in the memory 250. In FIGS. 8A to 8D, the horizontal axes represent the amount of clock shift φ, and the vertical axes represent the optical power P. The optical power observed by APD0 (solid line) and the optical power observed by APD1 (broken line) are schematically shown.

As shown in FIG. BA, when the clock phase is correct, an optical pulse is detected by APD0, hardly detected by APD1. As the clock phase deviates, the interference disappears. However, as the clock phase further deviates, the interference reappears, and an optical pulse is detected by APD 0. As described above, the detection outputs of APD0 periodically vary with the change in the amount of clock shift φ.

Figure 9:
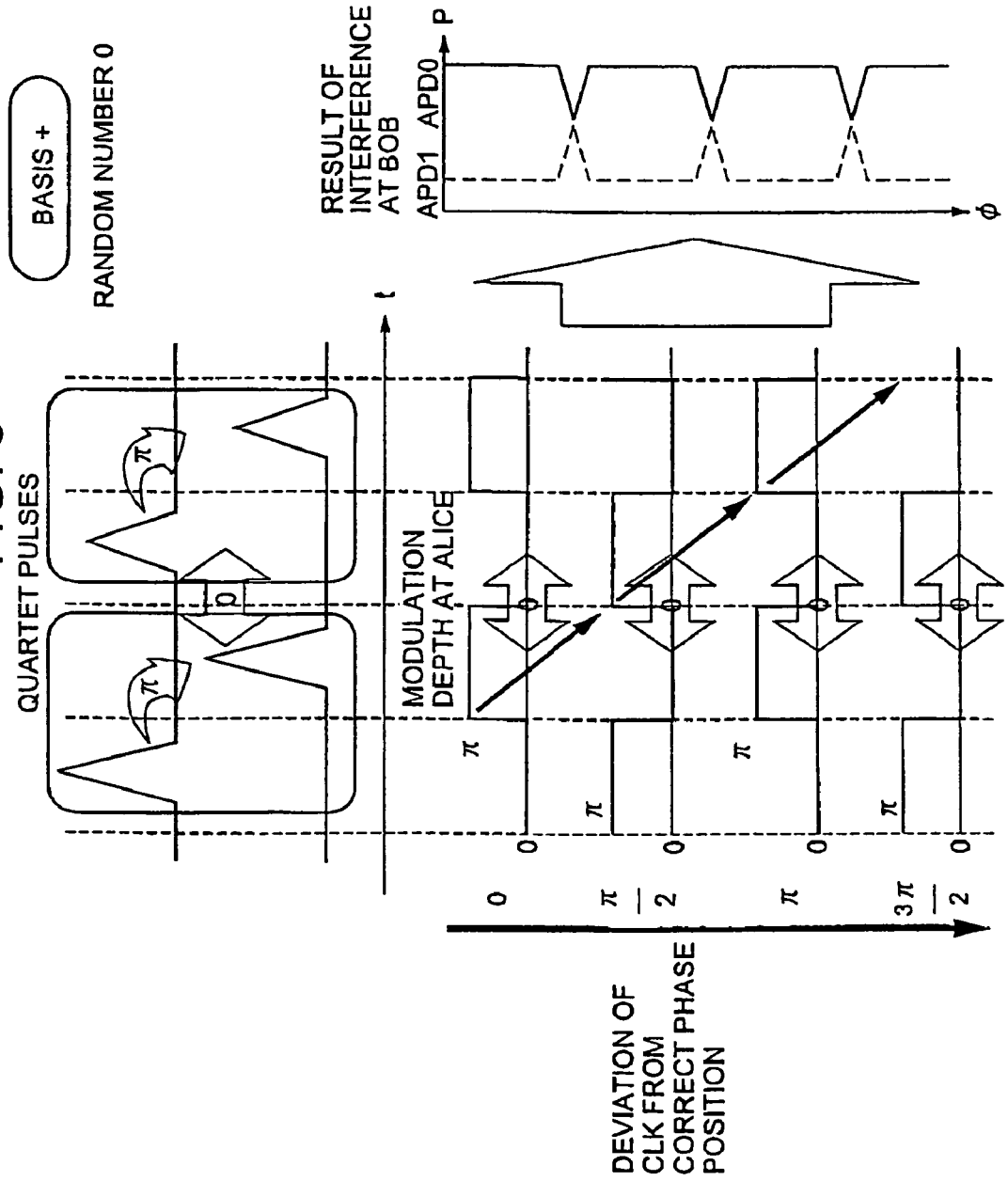
FIG. 9 is a diagram schematically showing the relationship between the timing shift effected at the sender and the measurement result obtained at the receiver when a combination of a basis and a random number is (+, 0).

FIG. 9 is a schematic diagram for explaining the periodical variations of the detection outputs of APD0 with the amount of clock shift φ, in the case of the combination of the basis "+" and the random number "0". When the clock phase is correct (a deviation of 0), phase modulation is properly performed on each optical pulse in the above-mentioned order "0-π-0-π", and light is output to APD0. However, as the clock phase deviates, the interference disappears. When the clock phase deviates by $\pi/2$ (a deviation of $\pi/2$), the interference reappears, and light is output to APD0. Thus, APD's observation values periodically varying as shown in FIG. 8A are obtained.

b) Basis +, Random Number 1 (π Modulation)

The timing controller 240 in the receiver 20 instructs the communication controller 130 in the sender 10 to set the phase modulator 102 at modulation depths corresponding to a combination of the basis "+" and the random number "1", while leaving the basis in the receiver 20 to be "+". As a result, as shown in Table 1 mentioned above, the phases for phase modulation to be respectively given to the quartet pulses are "0-π-π-0", in the order in which the quartet pulses pass through the phase modulator 102.

Subsequently, the timing controller 240 issues the instruction that the synchronization block 110 in the sender 10 clear the amount of clock shift to 0. The above-described steps S1 to S4 are repeated N times until the amount of clock shift reaches $2\pi$, while the clock timing is shifted by $2\pi/N$ each time. As a result of this, the optical powers observed by the photon detectors APD0 and APD1 in the receiver 20 are each changed. The observation values are stored in the memory 250. Note that since light should be output to APD1 when the random number "1" is transmitted, which will be discussed later, the extinction ratio is expressed as APD1/APD0.

FIG. 8B shows variations of the observation values with the amount of timing shift φ, thus stored in the memory 250. As shown in FIG. BB, when the clock phase is correct, an optical pulse is detected by APD1, hardly detected by APD0. As the clock phase deviates, the interference disappears, and the power observed by APD1 becomes equal to the power observed by APD0. When the clock phase further deviates, the appropriate interference reappears, and an optical pulse is detected by APD0. As described above, the detection outputs of APD1 periodically vary with the change in the amount of clock shift φ.

Figure 10:
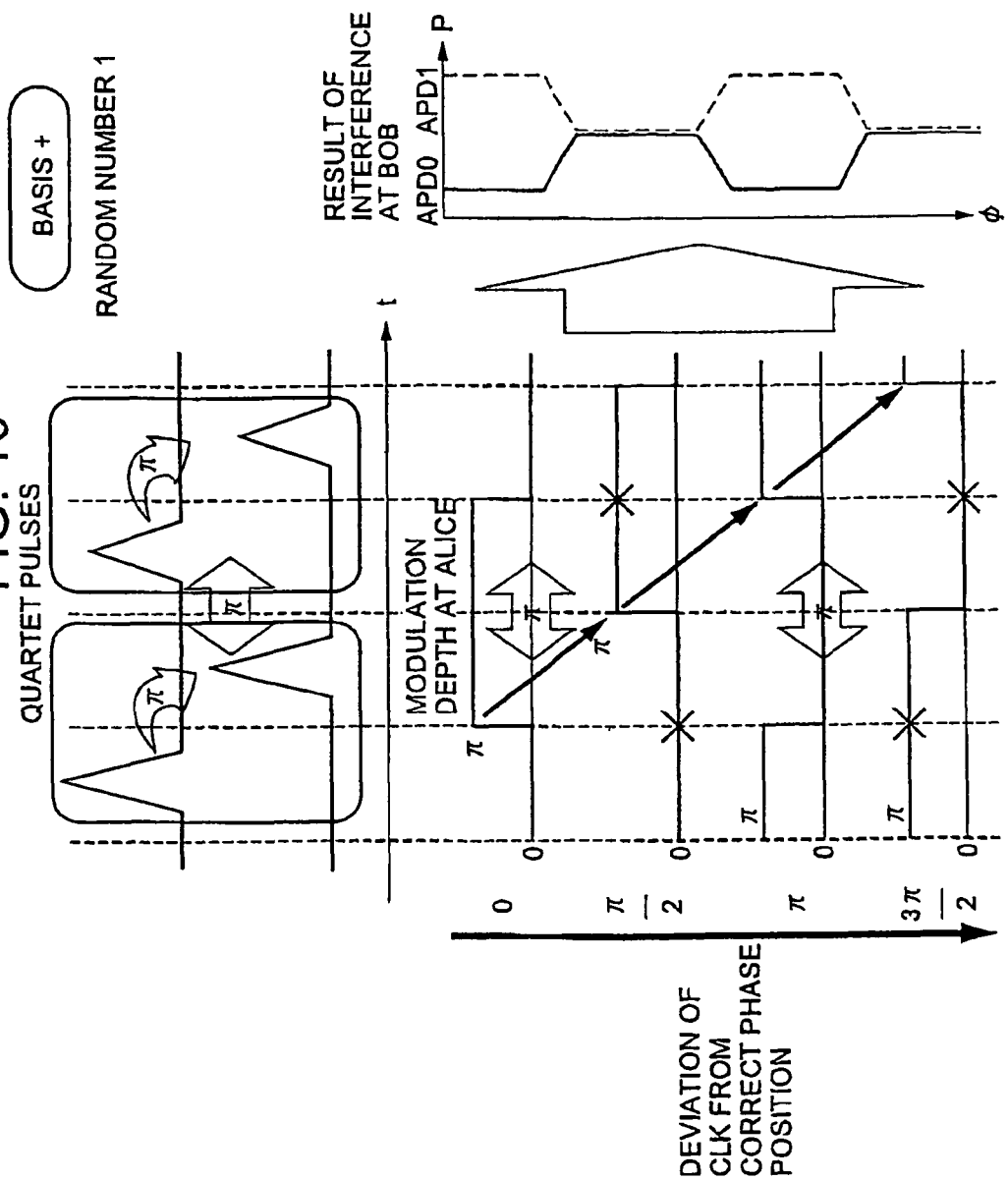
FIG. 10 is a diagram schematically showing the relationship between the timing shift effected at the sender and the measurement result obtained at the receiver when a combination of a basis and a random number is (+, 1).

FIG. 10 is a schematic diagram for explaining the periodical variations of the detection outputs of APD1 with the amount of clock shift φ, in the case of the combination of the basis "+" and the random number "1". When the clock phase is correct (a deviation of 0), phase modulation is properly performed on each optical pulse in the above-mentioned order "0-π-π-0". When the clock phase deviates by $\pi/2$ (a deviation of $\pi/2$), the interference disappears, and the power observed by APD 1 becomes equal to the power observed by APD0. When the clock phase further deviates by $\pi$ (a deviation of π), the interference reappears, and the result of detection is output from APD1. Thus, APD's observation values periodically varying as shown in FIG. 8B are obtained.

c) Basis x, Random Number 0 (π/2 Modulation)

The timing controller 240 in the receiver 20 first sets the reception basis of the phase modulator 260 at "x" and further instructs the communication controller 130 in the sender 10 to set the phase modulator 102 at modulation depths corresponding to a combination of the basis "x" and the random number "0". As a result, as shown in Table 1 mentioned above, the phases for phase modulation to be respectively given to the quartet pulses are "0-π-π/2-3π/2", in the order in which the quartet pulses pass through the phase modulator 102.

Subsequently, the timing controller 240 gives the instruction that the synchronization block 110 in the sender 10 clear the amount of clock shift to 0. Then, the above-described steps S1 to S4 are repeated N times until the amount of clock shift reaches 2π, while the clock timing is shifted by 2π/N each time. As a result of this, the optical powers observed by the photon detectors APD0 and APD1 in the receiver 20 are each changed. The observation values are stored in the memory 250. Note that the extinction ratio is expressed as APD0/APD1.

FIG. 8C shows variations of the observation values with the amount of timing shift φ, thus stored in the memory 250. As shown in FIG. 8C, when the clock phase is correct, an optical pulse is detected by APD0, hardly detected by APD1. As the clock phase deviates, the interference disappears, and the power observed by APD0 becomes equal to the power observed by APD1. When the clock phase further deviates, the interference reappears, but an optical pulse is detected by APD1 this time. As described above, the detection outputs of APD0 and APD1 periodically vary with the change in the amount of clock shift φ.

Figure 11:
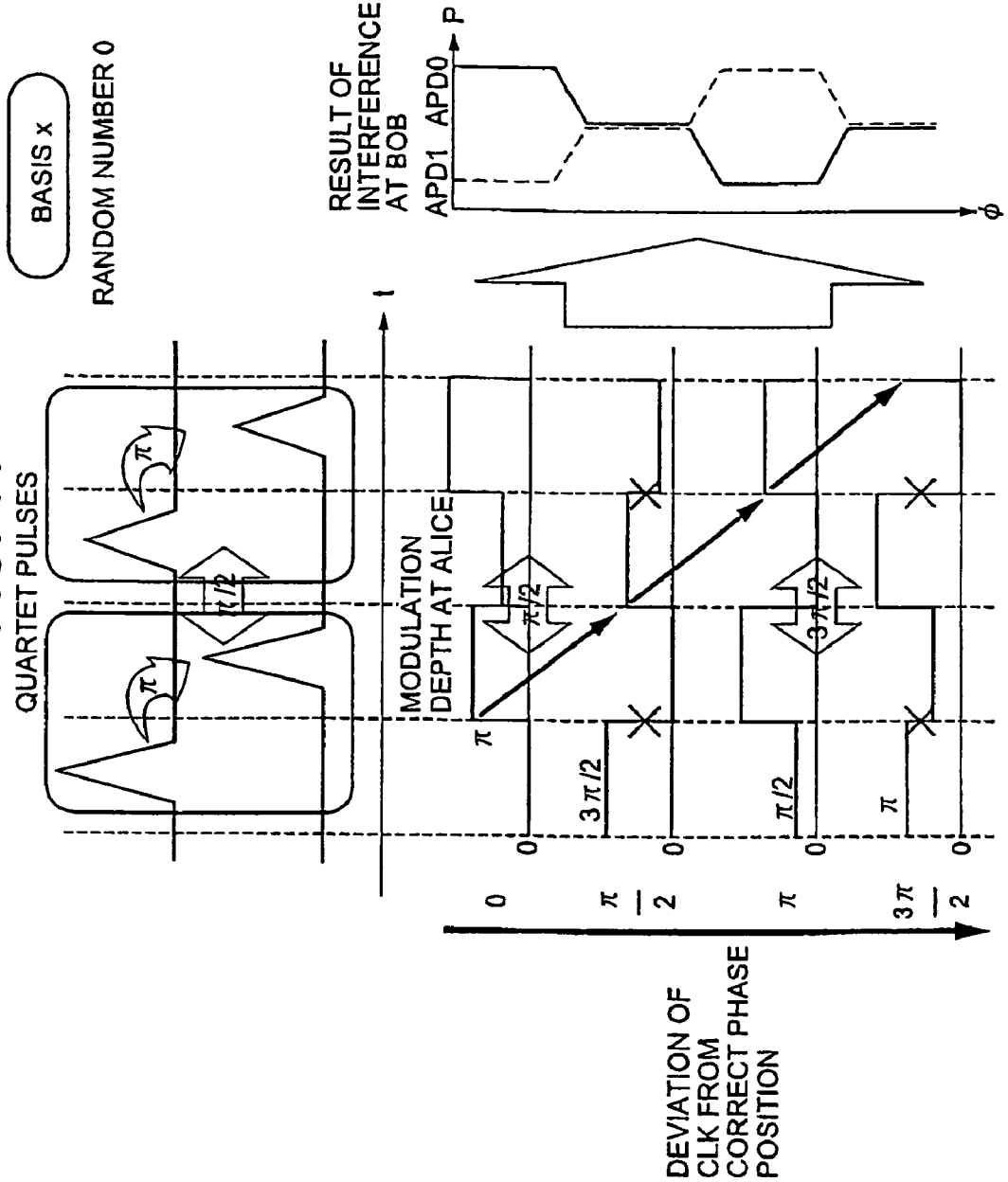
FIG. 11 is a diagram schematically showing the relationship between the timing shift effected at the sender and the measurement result obtained at the receiver when a combination of a basis and a random number is (x, 0).

FIG. 11 is a schematic diagram for explaining the periodical variations of the detection outputs of APD0 and APD1 with the amount of clock shift φ, in the case of the combination of the basis "x" and the random number "0". When the clock phase is correct (a deviation of 0), phase modulation is properly performed on each optical pulse in the above-mentioned order "0-π-π/2-3π/2". When the clock phase deviates by π/2 (a deviation of π/2), the interference disappears, and the power observed by APD0 becomes equal to the power observed by APD1. When the clock phase further deviates by π (a deviation of π), the interference reappears, but an optical pulse is detected by APD1 this time. Thus, APD's observation values periodically varying as shown in FIG. 8C are obtained.

d) Basis x, Random Number 1 (3π/2 Modulation)

The timing controller 240 in the receiver 20 instructs the communication controller 130 in the sender 10 to set the phase modulator 102 at modulation depths corresponding to a combination of the basis "x" and the random number "1", while leaving the basis in the receiver 20 to be "x". As a result, as shown in Table 1 mentioned above, the phases for phase modulation to be respectively given to the quartet pulses are "0-π-3π/2-π/2", in the order in which the quartet pulses pass through the phase modulator 102.

Subsequently, the timing controller 240 gives the instruction that the synchronization block 110 in the sender 10 clear the amount of clock shift to 0. The above-described steps S1 to S4 are repeated N times until the amount of clock shift reaches 2π, while the clock timing is shifted by 2π/N each time. As a result of this, the optical powers observed by the photon detectors APD0 and APD1 in the receiver 20 are each changed. The observation values are stored in the memory 250. Note that the extinction ratio is expressed as APD1/APD0.

FIG. 8D shows variations of the observation values with the amount of timing shift φ, thus stored in the memory 250. As shown in FIG. 8D, when the clock phase is correct, an optical pulse is detected by APD1, hardly detected by APD0. As the clock phase deviates, the interference disappears, and the power observed by APD1 becomes equal to the power observed by APD0. When the clock phase further deviates, the interference reappears, but an optical pulse is detected by APD0 this time. As described above, the detection outputs of APD0 and APD1 periodically vary with the change in the amount of clock shift φ.

Figure 12:
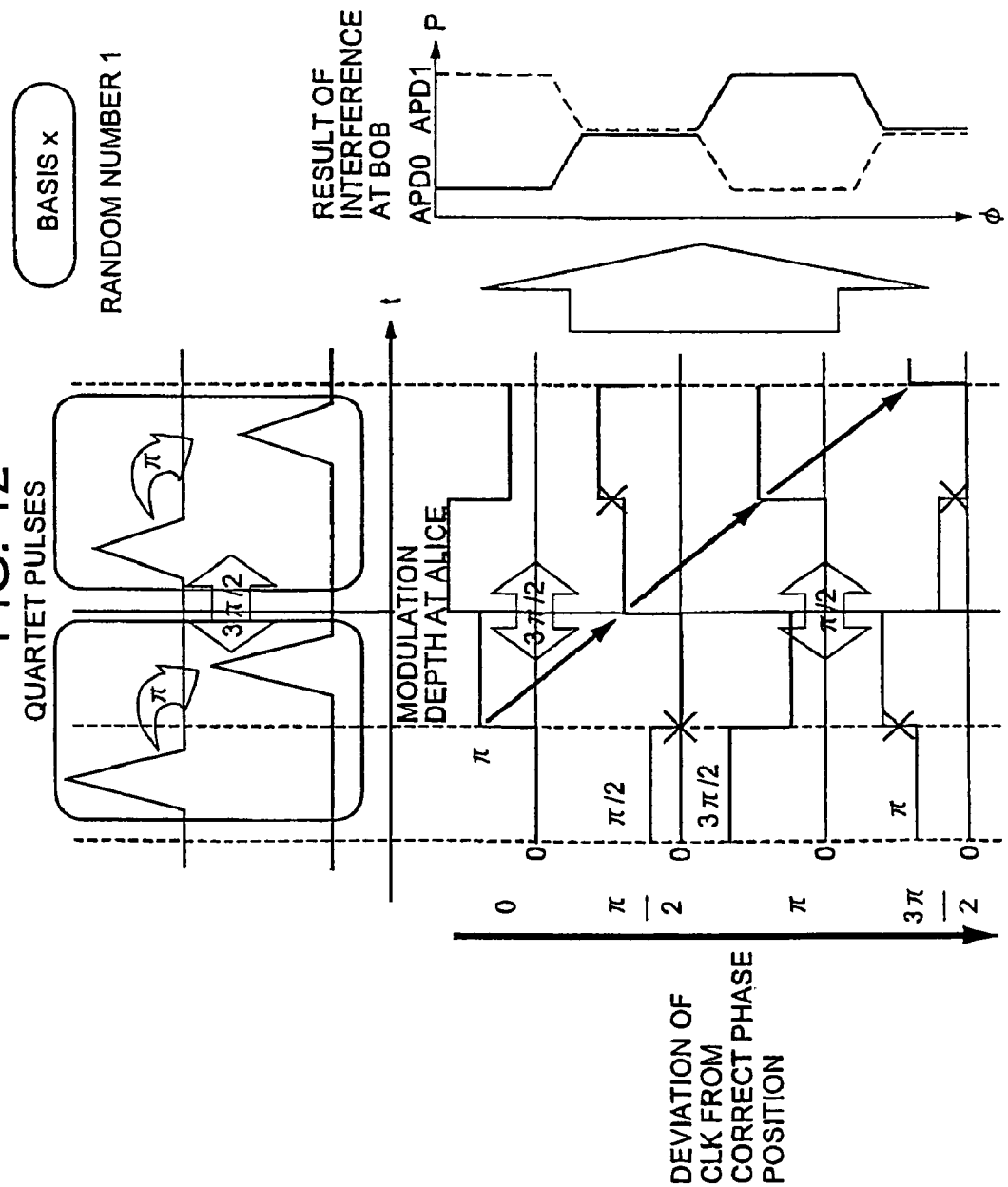
FIG. 12 is a diagram schematically showing the relationship between the timing shift effected at the sender and the measurement result obtained at the receiver when a combination of a basis and a random number is (x, 1).

FIG. 12 is a schematic diagram for explaining the periodical variations of the detection outputs of APD0 and APD1 with the amount of clock shift φ, in the case of the combination of the basis "x" and the random number "1". When the clock phase is correct (a deviation of 0), phase modulation is properly performed on each optical pulse in the above-mentioned order "0-π-3π/2-π/2". When the clock phase deviates by π/2 (a deviation of π/2), the interference disappears, and the power observed by APD 1 becomes equal to the power observed by APD0. When the clock phase further deviates by π (a deviation of π), the interference reappears, but an optical pulse is detected by APD0 this time. Thus, APD's observation values periodically varying as shown in FIG. 8D are obtained.

1.4) Determination of Sender's Optimum Timing

Referring to FIGS. 8A to 8D, the ratio between the optical powers observed by APD0 and APD1, that is, the extinction ratio is indicated by a dotted line. As mentioned above, the extinction ratio is expressed as APD0/APD1 when the random number "0" is transmitted, and is expressed as APD1/APD0 when the random number "1" is transmitted. Note that the extinction ratios shown here are obtained by schematically plotting the maximum and minimum points varying with the amount of clock shift φ, and the values on the vertical axes do not represent actual values. The values obtained by measuring the optical powers output to APD0 and APD1 and the corresponding amounts of clock shift φ effected at the sender 10 are all stored in the memory 250 of the receiver 20. Based on this data, the optimum clock timing in the sender 10 is determined.

FIG. 13 is a diagram schematically showing a data table of the data on the optical powers observed by APD0 and APD1 and the amount of clock shift, which is stored in the memory 250. That is, the observation data respectively obtained for the four combinations shown in FIGS. 8A to 8D are stored in a table form as shown in FIG. 13. Using this data table, the optimum timing is determined through the following procedure.

(1) The extinction ratio is calculated for each of the four types of modulation: $(A_i, B_i, C_i, D_i)$ (2) The product of the four extinction ratios is calculated: $(E_i = A_i * B_i * C_i * D_i)$ (3) A phase that makes maximum $E_i$ is selected: $(\phi(\max[E_1, E_2, \ldots, E_N]))$ The amount of shift φ determined in such a manner is the value φ indicated by the "optimum" line in FIGS. 8A to 8D. The clock signal CLK shifted by this amount provides the optimum timings synchronizing with the optical pulses. However, as mentioned already, if it is possible to obtain the optimum line, there is no need to use all the observation data obtained for the four combinations shown in FIGS. 8A to 8A.

1.5) Search for Receiver's Optimum Timing

Next, a search for the optimum clock timing in the receiver 20 will be described with reference to FIGS. 14 and 15A to 15D. In a quantum key distribution system, it is required to perform gated Geiger-mode reception in order to perform high-sensitivity reception using avalanche photodiodes (APD) because the optical power of a signal for key distribution is very weak, one photon per pulse at most. In the gated Geiger mode, the bias voltage is increased only at the timing of detecting a photon. However, if high bias voltage is applied, there arises a great possibility of outputting a noise, not a photon signal. Accordingly, it is preferable that the timing of applying the bias is as coincident with the timing of the arrival of a photon as possible. Properly setting the timing of increasing the bias voltage allows photon detection and sharing a cryptographic key between the sender 10 and the receiver 20.

Figure 14:
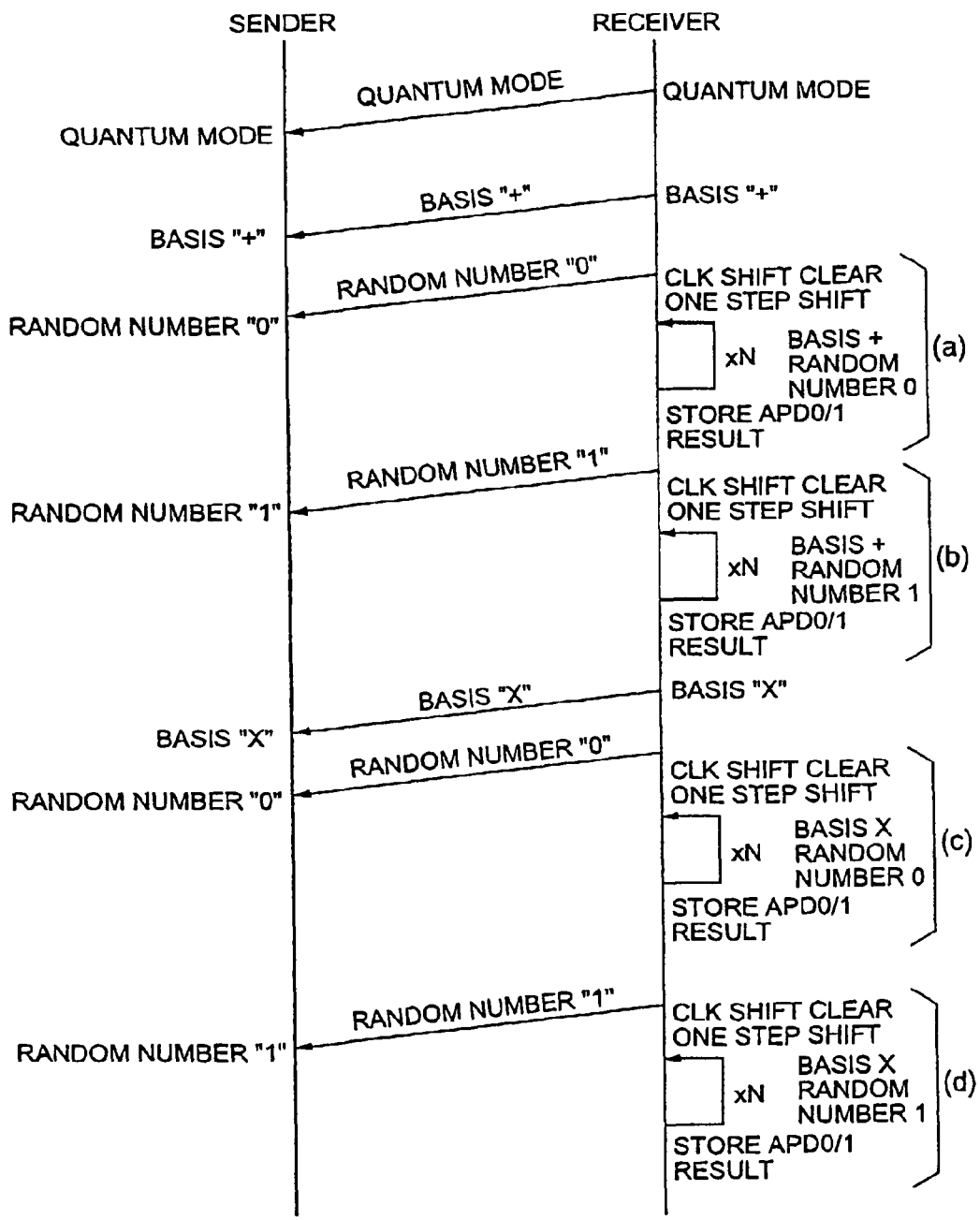
FIG. 14 is a handshake diagram showing a sequence of the control of the receiver's timing, with respect to the four combinations of a basis and a random number.

FIG. 14 is a handshake diagram showing a sequence of the control of the receiver's timing, with respect to the four combinations of a basis and a random number. FIGS. 15A to 15D are graphs schematically showing variations in the power detected at the receiver, with respect to the four combinations of a basis and a random number, respectively. Since the optimum clock timing in the receiver 20 can be determined locally, a smaller number of control signals are exchanged than in the case of the control of timing in the sender 10. Since the sender 10 has four types of modulation corresponding to the combinations of a basis and a random number as described above, a search for the optimum clock timing in the receiver 20 is performed for each type of modulation effected at the sender 10.

In a timing search in the receiver, the timing controller 240 first sets the receiver 20 in the quantum mode and transmits to the sender 10 a mode change signal for changing to the quantum mode. As a result of this, double pulses of ordinary optical power are transmitted from the receiver 20 to the sender 10, and optical pulses of weak power modulated as described above are returned from the sender 10 to the receiver 20.

Upon the setting into the quantum mode, the timing controller 240 controls the communication controller 230 so that the reception basis used on its own side in the quantum block 200 is set at "+". Further, the timing controller 240 gives the instruction that the basis and random number used in the quantum block 100 of the sender 10 are set at "+" and "0", respectively. APD0 and APD1 are driven in the gated Geiger mode in accordance with the clock signal CLK supplied from the synchronization block 210. Accordingly, the timing of increasing the bias voltage to be applied to APD0 and APD1 is determined by the timing of supplying the clock signal CLK (clock timing). The synchronization block 210 can shift the clock timing by an arbitrary number of steps ranging from 0 to $2\pi$. The shifting of the clock timing is all performed locally in the receiver 20.

First, the timing controller 240 in the receiver 20 instructs the synchronization block 210 to set the clock step at 0. Subsequently, the timing controller 240 instructs the synchronization block 210 to shift the clock signal CLK by one step, whereby reverse bias voltage is applied to the photon detectors APD0 and APD1. Thus, the pulse P1 of weak power arriving from the sender 10 is phase-modulated by the phase modulator 206, resulting in the pulse P1*$^b$, and the result of the interference of this pulse P1*$^b$ and the arriving pulse P2*$^a$ is detected by the photon detector APD0 or APD1 and stored in the memory 250 as a result of photon detection.

The timing controller 240 repeats this operation until the total amount of clock shift reaches $2\pi$, while shifting the timing of voltage application to the photon detectors APD0 and APD1 by one step each time. The results of photon detection, obtained for the set basis "+" and random number "0", are recorded.

FIG. 15A shows variations of the observation values with the amount of timing shift $\phi$, thus stored in the memory 250. In FIGS. 15A to 15D, the horizontal axes represent the amount of clock shift $\phi$, and the vertical axes represent the observed optical power. The optical power observed by APD0 (solid line) and the optical power observed by APD1 (broken line) are schematically shown. As shown in FIG. 15A, when the clock phase is correct, a photon is detected by APD0 because "0" is the random number transmitted from the sender 10. When the clock phase deviates, no photon is detected.

Similarly thereafter, the combination of a basis and a random number used in the sender 10 is changed to "+, 1", "x, 0" and "x, 1" in this order as shown at (b) to (d) in FIG. 14. For each combination, the clock timing in the receiver 20 is shifted, and the results of photon detection by APD0 and APD1 are stored in the memory 250, as shown in FIGS. 15B to 15D.

1.6) Determination of Receiver's Optimum Timing

In FIGS. 15A to 15D, the ratio between the output powers of APD0 and APD1, that is, the photon detection ratio, or extinction ratio, is indicated by a dotted line. When the random number "0" is transmitted, since light should be output to APD0 here, the photon detection is expressed by the ratio of the observation value obtained by APD0 to the observation value obtained by APD1 (APD0/APD1). Moreover, when the random number "1" is transmitted, since light should be output to APD1, the photon detection is expressed by the ratio of the observation value obtained by APD1 to the observation value obtained by APD0 (APD1/APD0). Note that the extinction ratios shown here are obtained by schematically plotting the maximum and minimum points varying with the amount of clock shift $\phi$, and the values on the vertical axes do not represent actual values.

The output powers of APD0 and APD1 and the then amounts of clock shift $\phi$ effected at the receiver 20 are all stored in the memory 250. Based on this data, the optimum clock timing in the receiver 20 is determined. Since a determination method is similar to the method used in the case of the sender 10 described in the section 1.4), description thereof will be omitted.

The clock signal CLK shifted by the amount thus determined is in good synchronization with the timing of the incidence of an optical pulse. Moreover, the clock CLK shifted by the amount thus determined is also used by the phase modulator 206 in the receiver 20 because of being in the same receiver 20.

1.7) Advantages

As described hereinabove, according to the present embodiment, under the control of the receiver 20, the timings of phase modulation in the sender 10 are first shifted by one step after another, and each time the timings are shifted by one step, the result of detection obtained at the receiver 20 is stored in the memory 250. Based on the stored data, the optimum timings of phase modulation in the sender 10 are determined. Accordingly, it is possible for the receiver side to check whether or not the timings of phase modulation in the sender 10 are right. As a result, the timing of driving the photon detectors in the receiver 20 can be made to precisely coincide with the timing of the incidence of a photon. Thus, stable phase modulation and photon detection can be achieved. When the present embodiment is applied to a quantum key distribution system, fast and stable key generation can be realized.

2. Second Embodiment

FIG. 16 is a block diagram showing a configuration of a quantum key distribution system according to a second embodiment of the present invention. As in the first embodiment, the quantum key distribution system according to the present embodiment employs a plug and play configuration. However, the present embodiment is different from the first embodiment in that a faraday mirror, not the PBS loop, is used in the quantum block 100 of the sender 10. Note that blocks having functions similar to those shown in FIG. 3 are given the same reference numerals and symbols as in FIG. 3, and detailed description thereof will be omitted.

The quantum block 100 in sender 10 includes a faraday mirror 101, phase modulator 102 and variable optical attenuator 105, which are connected in series. Double pulses coming from the transmission line 30 are reflected by the faraday mirror 101 with their polarization rotated by $\pi/2$ each, and then the subsequent pulse only is modulated by the phase modulator 102. In other words, the phase modulator 102 performs one of four depths of modulation (0, $\pi$, $\pi/2$, and $3\pi/2$) depending on a combination of a basis and a random number, synchronously with the timing when the second pulse of the double pulses in the return direction is passing through the phase modulator 102.

Accordingly, the system of the present embodiment is different from the system of the first embodiment only in the phase of the clock CLK to be supplied to the phase modulator 102 in the sender 10 and hence in the result of interference detected by the photon detectors APD0 and APD1. A method of determining the optimum clock timing for driving the phase modulator 102 and a method of determining the optimum clock timing for driving the photon detectors APD0 and APD1 are similar to the procedure described in the first embodiment in conjunction with FIG. 6. Therefore, operation in the present embodiment will be described briefly with reference to, when deemed appropriate, FIGS. 6 and 7A to 7D used in the first embodiment.

2.1) Timing Control Procedure

According to the second embodiment, as in the first embodiment, control of timing is first performed for the sender 10 and then performed for the receiver 20. Control of timing in the sender 10 is all performed under instructions from the timing controller 240 in the receiver 20.

Referring to FIG. 6, the timing controller 240 first sets the receiver 20 in the training mode. With this setting, the photon detectors APD0 and APD1 operate with a fixed bias, not in the gated Geiger mode, and measure the average optical power. Subsequently, the timing controller 240 controls the communication controller 230 so that a mode change signal for changing to the training mode is transmitted to the sender 10. With this signal, the communication controller 130 in the sender 10 causes the variable optical attenuator 105 to reduce the amount of loss and thereby increases the output optical power to an ordinary communication level (S401). Thus, double pulses of ordinary optical power are transmitted from the receiver 20 to the sender 10, reflected by the faraday mirror 101 in the sender 10, phase-modulated as described above, and then returned from the sender 10 to the receiver 20.

Upon the setting into the training mode, the timing controller 240 controls the communication controller 230 so that one of the four combinations of a basis and a random number is selected, that the selected basis is set on the phase modulator 206 in the receiver 20, and that the selected basis and random number are notified for designation to the communication controller 130 in the sender 10 (S402). With this designation, the communication controller 130 outputs phase control signals to the phase modulator 102 and thereby sets modulation depths (phases) corresponding to a combination of the selected basis and random number.

Subsequently, the timing controller 240 instructs the communication controller 130 in the sender 10 to reset the timing shift for voltage application to the phase modulator 102 in the sender 10 (S403). With this instruction, the synchronization block 110 resets the amount of shift of the clock signal CLK to an initial value of 0.

When the timing shift is initialized, the timing controller 240 instructs the communication controller 130 to effect a timing shift. With this instruction, the synchronization block 110, using a predetermined integer N, shifts the timing of voltage application to the phase modulator 102 by $2\pi/N$, and a voltage corresponding to the set phase modulation is applied at this timing (S404). Thus, the double pulses arriving from the receiver 20 pass through the phase modulator 102 as they are, on their incoming path leading to the reflection point. On their return path after reflected by the faraday mirror 101, only the second pulse of the double pulses is modulated by the phase modulator 102, and then the double pulses are returned to the receiver 20.

In the receiver 20, the first pulse of the received double pulses is modulated by the phase modulator 206 using the designated basis as described above and then the double pulses interfere with each other at the optical coupler 203. The optical powers are measured by APD0 and APD1, and the measurement values obtained by APD0 and APD1 are recorded in the memory 250 (S405).

The timing controller 240 repeats the above-described steps S404 and S405 until measurement has been made for all the voltage application timings, while shifting the timing of voltage application to the phase modulator 102 by $2\pi/N$ each time. The measurement values of the received optical powers, obtained for the selected basis and random number, are recorded (S406).

The timing controller 240 performs the above-described steps S402 to S406 for every one of the four combinations of a basis and a random number (S407). When measurement is completed for all the four combinations of a basis and a random number (S407: YES), the timing controller 240 determines the sender's optimum timing, based on the results of measurement by APD0 and APD1 stored in the memory 250 is (S408). A method of determining the optimum timing will be discussed later.

After the sender's optimum timing is thus determined, a timing search is started for the receiver 20. A search for the receiver's timing is performed similarly to the first embodiment. Therefore, hereinafter, a search for the sender's timing will be described.

2.2) Search for Clock Timing in Sender

FIGS. 17A to 17D are graphs showing variations in the average power measured at the receiver, with respect to the four combinations of a basis and a random number, respectively. Note that an optical path difference existing between the faraday mirror 101 and the phase modulator 102 is ignored here.

a) Basis +, Random Number 0 (0 Modulation)

The timing controller 240 in the receiver 20 first sets the reception basis of the phase modulator 206 at "+" and further instructs the communication controller 130 in the sender 10 to set the phase modulator 102 at a modulation depth corresponding to a combination of the basis "+" and the random number "0". In this case, a modulation depth of 0 is given to the second pulse P2 of the double pulses passing through the phase modulator 102 on their return path. Therefore, no change occurs in the optical powers observed by the photon detectors APD0 and APD1 in the receiver 20, even if the timing shift operation is repeated N times until the amount of clock shift reaches 2, while the synchronization block 110 shifts the clock timing by $2\pi/N$ each time. The observation values are stored in the memory 250. Note that since light should be output to APD0 when the random number "0" is transmitted, the extinction ratio is expressed as APD0/APD1.

FIG. 17A shows variations of the observation values with the amount of timing shift $\phi$, thus stored in the memory 250.

In FIGS. 17A to 17D, the horizontal axes represent the amount of clock shift φ, and the vertical axes represent the observed optical power. The optical power observed by APD0 (solid line) and the optical power observed by APD1 (broken line) are schematically shown.

b) Basis +, Random Number 1 (π Modulation)

The timing controller 240 in the receiver 20 instructs the communication controller 130 in the sender 10 to set the phase modulator 102 at a modulation depth corresponding to a combination of the basis "+" and the random number "1", while leaving the basis in the receiver 20 to be "+". In this case, a modulation depth of π is given to the second pulse P2 of the double pulses passing through the phase modulator 102 on their return path. When the timing shift operation is repeated N times until the amount of clock shift reaches 2π, while the synchronization block 110 shifts the clock timing by 2π/N each time, then changes occur in the optical powers observed by the photon detectors APD0 and APD1 in the receiver 20.

When the random number "1" is transmitted, light should be output to APD1. Therefore, as shown in FIG. 17B, when the clock phase is correct, an optical pulse is detected by APD1, hardly detected by APD0. As the clock phase deviates, the interference disappears. However, when the clock phase further deviates, the interference reappears, and an optical pulse is detected by APD1. As described above, the detection outputs of APD1 periodically vary with the change in the amount of clock shift φ.

c) Basis x, Random Number 0 (π/2 Modulation)

The timing controller 240 in the receiver 20 first sets the reception basis of the phase modulator 206 at "x" and further instructs the communication controller 130 in the sender 10 to set the phase modulator 102 at a modulation depth corresponding to a combination of the basis "x" and the random number "0". In this case, a modulation depth of π/2 is given to the second pulse P2 of the double pulses passing through the phase modulator 102 on their return path. When the timing shift operation is repeated N times until the amount of clock shift reaches 2π, while the synchronization block 110 shifts the clock timing by 2π/N each time, then changes occur in the optical powers observed by the photon detectors APD0 and APD1 in the receiver 20.

When the random number "0" is transmitted, light should be output to APD0. Therefore, as shown in FIG. 17C, when the clock phase is correct, an optical pulse is detected by APD0, hardly detected by APD1. As the clock phase deviates, the interference disappears. However, when the clock phase further deviates, the interference reappears, and an optical pulse is detected by APD1 this time. As described above, the detection outputs of APD0 and APD1 periodically vary with the change in the amount of clock shift φ.

d) Basis x, Random Number 1 (3π/2 Modulation)

The timing controller 240 in the receiver 20 instructs the communication controller 130 in the sender 10 to set the phase modulator 102 at a modulation depth corresponding to a combination of the basis "x" and the random number "1", while leaving the basis in the receiver 20 to be "x". In this case, a modulation depth of 3π/2 is given to the second pulse P2 of the double pulses passing through the phase modulator 102 on their return path. When the timing shift operation is repeated N times until the amount of clock shift reaches 2π, while the synchronization block 110 shifts the clock timing by 2π/N each time, then changes occur in the optical powers observed by the photon detectors APD0 and APD1 in the receiver 20.

When the random number "1" is transmitted, light should be output to APD1. Therefore, as shown in FIG. 17D, when the clock phase is correct, an optical pulse is detected by APD1, hardly detected by APD0. As the clock phase deviates, the interference disappears. However, when the clock phase further deviates, the interference reappears, and an optical pulse is detected by APD0 this time. As described above, the detection outputs of APD0 and APD1 periodically vary with the change in the amount of clock shift φ.

2.3) Advantages

As described hereinabove, according to the second embodiment, under the control of the receiver 20, the timing of phase modulation in the sender 10 is first shifted by one step after another, and each time the timing is shifted by one step, the result of detection obtained at the receiver 20 is stored in the memory 250. Based on the stored data, the optimum timing of phase modulation in the sender 10 is determined. Accordingly, it is possible for the receiver side to check whether or not the timing of phase modulation in the sender 10 is right. As a result, the timing of driving the photon detectors in the receiver 20 can be made to precisely coincide with the timing of the incidence of a photon. Thus, stable phase modulation and photon detection can be achieved. When the present embodiment is applied to a quantum key distribution system, fast and stable key generation can be realized.

3. Other Timing Control Procedures

In the above-described first embodiment, as shown in FIG. 6, after the amount of timing shift is initialized, the timings of phase modulation are sequentially shifted by a constant shift amount of 2π/N, and the variations in the received optical power are recorded, whereby the search for the optimum timing is performed. However, the present invention is not limited to this timing control procedure, and other timing control procedures can be employed.

3.1) Third Embodiment

FIG. 18 is a flowchart showing a timing control procedure according to a third embodiment of the present invention. Note that steps having the same functions as the steps in FIG. 6 are given the same reference numerals and symbols as in FIG. 6, and description thereof will be omitted.

The basic flow of the timing control according to the present embodiment is similar to the timing control procedure of the first embodiment shown in FIG. 6. However, in the timing control of the present embodiment, the initial value at the start of a search is not set at 0 but at a position $(2\pi/N)*i$ (i is an integer) that is empirically determined. That is, it is possible to roughly estimate the amount of shift if the characteristics of the phase modulators and electric circuits in use and the transmission distance are taken into account. Therefore, a search range is defined by integers i and j, in the vicinity of the estimated value with some margin, and a timing search is performed within this range.

Specifically, referring to FIG. 18, the timing controller 240 stores the integers i and j in advance. When a random number and a basis are designated (S402), the timing controller 240 instructs the communication controller 130 in the sender 10 to reset the timing shift for voltage application to the phase modulator 102 in the sender 10 to the predetermined position, $(2\pi/N)*i$ (S403a). With this instruction, the synchronization block 110 resets the amount of shift of the clock signal CLK to an initial value of $(2\pi/1N)*i$.

When the timing shift is initialized, the timing controller 240 instructs the communication controller 130 to effect a timing shift. With this instruction, the synchronization block 110 shifts the timing of voltage application to the phase modulator 102 by 2π/N from the initial value, and voltages corresponding to the set phase modulations are applied at that timing (S404). Thus, each pulse of the quartet pulses passing through the phase modulator 102 is modulated as described above and then returned to the receiver 20 in the form of the double pulses.

In the receiver 20, the first pulse of the received double pulses is modulated by the phase modulator 206 using the designated basis as described above and then the double pulses interfere with each other at the optical coupler 203. The optical powers are measured by APD0 and APD1, and the measurement values are recorded in the memory 250 (S405).

In such a manner, the timing controller 240 repeats the above-described steps S404 and S405 the predetermined number of times (j times) while shifting the timing of voltage application to the phase modulator 102 by $2\pi/N$ each time. The measurement values of the received optical powers, obtained for the selected basis and random number, are recorded (S406a). Thereafter, similarly, the steps S402 to S406 are performed for every one of the four combinations of a basis and a random number (S407), and the sender's optimum timing is determined (S408). By using empirical knowledge as described above, a fast search can be achieved.

In a search for the receiver's timing as well, similarly, a search range that can be empirically determined in advance is defined by the integers i and j, and the timing is reset to an initial value of $(2\pi/N)*i$ (S503a). Then, the steps S504 and S505 are repeated j times.

3.2) Fourth Embodiment

Figure 19:
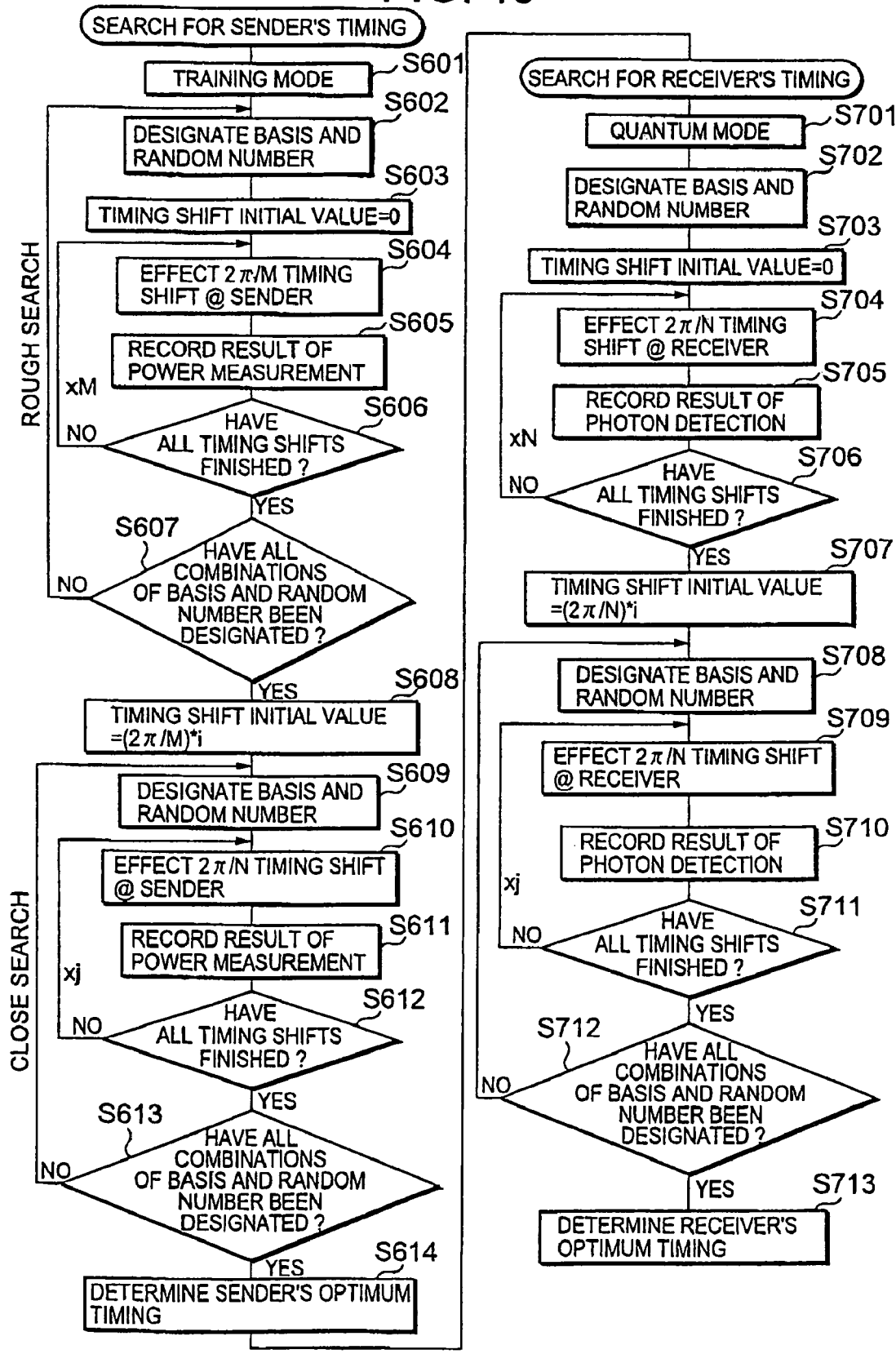
FIG. 19 is a flowchart showing a timing control sequence according to a fourth embodiment of the present invention.

FIG. 19 is a flowchart showing a timing control procedure according to a fourth embodiment of the present invention.

In a search for the sender's timing according to the present embodiment, a rough search (S602 to S608) is first performed to narrow down a range where the optimum timing is present to some extent, and then a close search of this range (S609 to S614) is performed. Thus, the optimum timing can be accurately located at high speed.

Moreover, in a search for the receiver's timing according to the present embodiment, one combination of a basis and a random number is designated, and the results of photon detection are recorded. Based on this record, a range where the optimum timing is present is narrowed down to some extent (S702 to S707). Subsequently, a search of this range is performed while designating another combination of a basis and a random number (S708 to S713) Thus, the optimum timing can be accurately located at high speed. Hereinafter, detailed description will be given.

A) Search for Sender's Timing

Referring to FIG. 19, first, the timing controller 240 stores integers M, N (M<N) and j (j<N) in advance. When a search for the sender's timing is started, the timing controller 240 sets the receiver 20 in the training mode and further transmits a mode change signal for changing to the training mode to the sender 10 (S601). Upon the setting into the training mode, the timing controller 240 selects one of the four combinations of a basis and a random number, sets the selected basis on the phase modulator 206 in the receiver 20, and notifies the sender 10 of the selected basis and random number for designation (S602).

Subsequently, the timing controller 240 instructs the sender 10 to reset the timing shift for voltage application to the phase modulator 102 in the sender 10 (S603), and then instructs the sender 10 to effect a timing shift. With this instruction, the synchronization block 110 in the sender 10, using the predetermined integer M, shifts the timings of voltage application to the phase modulator 102 by $2\pi/M$, and voltages corresponding to the set phase modulations are applied at that timing (5604). Thus, each optical pulse of the quartet pulses passing through the phase modulator 102 is modulated as described above and then returned to the receiver 20 in the form of the double pulses.

In the receiver 20, the first pulse of the received double pulses is modulated by the phase modulator 206 using the designated basis as described above and then the double pulses interfere with each other at the optical coupler 203. The optical powers are measured by APD0 and APD1, and the measurement values are recorded in the memory 250 (S605).

The timing controller 204 repeats the above-described steps S604 and S605 until measurement has been made for all the M voltage application timings, while shifting the timing of voltage application to the phase modulator 102 by $2\pi/M$ each time. The measurement values of the received optical powers, obtained for the designated basis and random number, are recorded (S606). Since M is smaller than N, a shift step of $2\pi/M$ is broader than that of the following close search, resulting in a rough search being possible.

The timing controller 240 performs the above-described steps S602 to S606 for every one of the four combinations of a basis and a random number (S607). When measurement is completed for all the four combinations of a basis and a random number (S607: YES), the timing controller 240, based on the results of measurement by APD0 and APD1 stored in the memory 250, determines the optimum timing position, $(2\pi/M)*i$, where the sender's optimum timing is present, as the initial value for a close search to be next performed. A method of determining the optimum timing is as described in the first embodiment.

Next, the timing controller 240 instructs the sender 10 to set the timing shift for voltage application to the phase modulator 102 in the sender 10 at the determined optimum timing position, $(2\pi/M)*i$ (S608). Further, the timing controller 240 selects one of the four combinations of a basis and a random number, sets the selected basis on the phase modulator 206 in the receiver 20, and notifies the sender 10 of the selected basis and random number for designation (S609). Subsequently, at an instruction to the sender 10 to effect a timing shift, the synchronization block 110 in the sender 10, using the predetermined number N, shifts the timings of voltage application to the phase modulator 102 by $2\pi/N$, and voltages corresponding to the set phase modulations are applied at that timing (s610). Thus, each optical pulse of the quartet pulses passing through the phase modulator 102 is modulated as described above and then returned to the receiver 20 in the form of the double pulses.

In the receiver 20, the first pulse of the received double pulses is modulated by the phase modulator 206 using the designated basis as described above and then the double pulses interfere with each other at the optical coupler 203. The optical powers are measured by APD0 and APD1, and the measurement values are recorded in the memory 250 (S611).

The timing controller 240 repeats the above-described steps S610 and 611 until measurement has been made for all the j voltage application timings, while shifting the timings of voltage application to the phase modulator 102 by $2\pi/N$ each time. The measurement values of the received optical powers, obtained for the selected basis and random number, are recorded (S612). Since N is larger than M, a shift step of $2\pi/N$ is a narrower step, resulting in a close search being possible.

The timing controller 240 performs the above-described steps S609 to S612 for every one of the four combinations of a basis and a random number (S613). When measurement is completed for all the four combinations of a basis and a random number (S613: YES), the timing controller 240 determines the sender's optimum timing, based on the results of measurement by APD0 and APD1 recorded in the memory 250 (S614).

B) Search for Receiver's Timing

In a search for the receiver's timing, the timing controller 240 first sets the receiver 20 in the quantum mode to allow the photon detectors APD0 and APD1 to operate in the gated Geiger mode, and further transmits a mode change signal for changing to the quantum mode to the sender 10. With this signal, the communication controller 130 in the sender 10 causes the variable optical attenuator 105 to increase the amount of loss and thereby reduces the output optical power to a level of one photon per pulse at most (S701).

Upon the setting into the quantum mode, the timing controller 240 selects one of the four combinations of a basis and a random number, sets the selected basis on the phase modulator 206 in the receiver 20, and notifies the communication controller 130 in the sender 10 of the selected basis and random number for designation (S702).

Subsequently, the timing controller 240 controls the synchronization block 210 so that the timing shift for voltage application to the photon detectors APD0 and APD1 is reset to 0 (S703). When the timing shift is initialized, the timing controller 240 controls the synchronization block 210 so that, using the predetermined integer N, the synchronization block 210 shifts the clock signal CLK by $2\pi/N$, and reverse bias voltage is applied to the photon detectors APD0 and APD1 (S704). Thus, the result of interference of the weak-power pulses arriving from the sender 10 is detected by the photon detector APD0 or APD1, and the result of this photon detection is recorded in the memory 250 (S705).

The timing controller 240 repeats the above-described steps S704 and S705 until all the voltage application timings have finished, while shifting the timing of voltage application to the photon detectors APD0 and APD1 by $2\pi/N$ each time. The results of photon detection, obtained for the selected basis and random number, are recorded (S706). When the timing shift is completed (S706: YES), the timing controller 240, based on the results of photon detection by APD0 and APD1 recorded in the memory 250, determines the receiver's optimum timing, $(2\pi/N)*i$, for the currently selected combination of a basis and a random number, and sets it as the initial value for the next search (S707). A method of determining the optimum timing is as described already.

Subsequently, using the determined optimum timing, $(2\pi/N)*i$, as the initial value, the timing controller 240 further selects one of the remaining three combinations of a basis and a random number, sets the selected basis on the phase modulator 206 in the receiver 20, and notifies the sender 10 of the selected basis and random number for designation (S708).

Subsequently, the timing controller 240 controls the synchronization block 210 so that the synchronization block 210, using the predetermined integer N, shifts the clock signal CLK by $2\pi/N$, and reverse bias voltage is applied to the photon detectors APD0 and APD1 (S709). Thus, the result of interference of the weak-power pulses arriving from the sender 10 is detected by the photon detector APD0 or APD1, and the result of this photon detection is recorded in the memory 250 (S710).

The timing controller 240 repeats the above-described steps S709 and S710 until all the j voltage application timings have finished, while shifting the timing of voltage application to the photon detectors APD0 and APD1 by $2\pi/N$ each time. The results of photon detection, obtained for the selected basis and random number, are recorded (S711). When the timing shift is completed (S711: YES), the steps S708 to S711 are performed for every one of the remaining combinations of a basis and a random number (S712). When measurement is completed for all the four combinations of a basis and a random number (S712: YES), the timing controller 240 determines the receiver's optimum timing, based on the results of measurement by APD0 and APD1 recorded in the memory 250 (S713). A method of determining the optimum timing is as described already.

(Second Mode)

The present invention is applicable not only to the quantum key distribution systems but also to optical communication systems in general that require the modulation timing on the sender side to be checked as described below. Hereinafter, as an application mode, a one-way system will be described in which a receiver receives an optical pulse phase-modulated by a sender.

Figure 20:
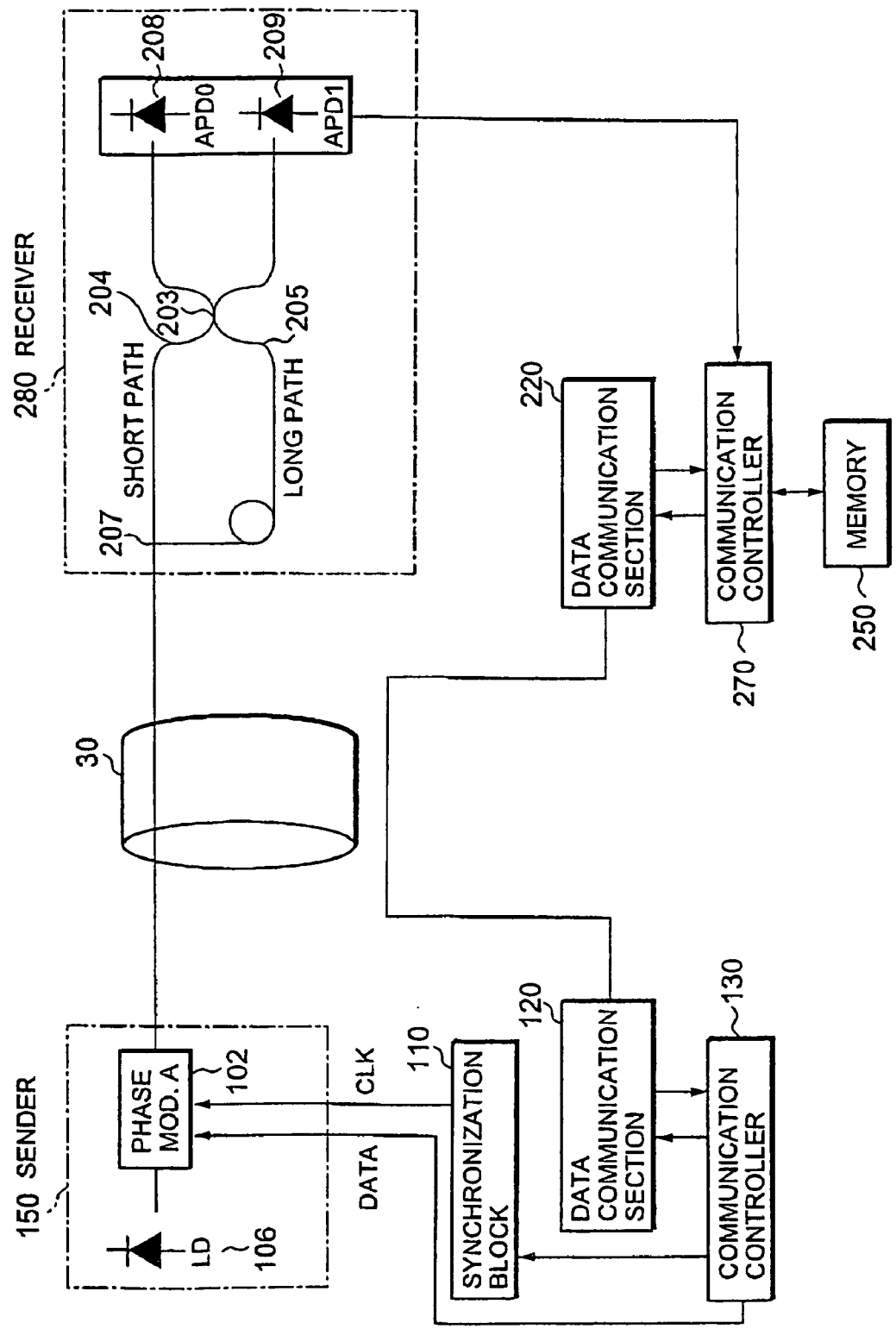
FIG. 20 is a block diagram showing a configuration of an optical communication system according to a second mode for carrying out the present invention.

FIG. 20 is a block diagram showing a configuration of an optical communication system according to a second mode or carrying out the present invention. A sender is provided, in place of the quantum block, with a phase modulation block 150 including a laser light source 106 and a phase modulator 102. The laser light source 106 is pulse-driven to output optical pulses, which are phase-modulated by the phase modulator 102 and then sent out to an optical fiber transmission line 30. In addition, the sender is also provided with a synchronization block 110, a data communication section 120 and a communication controller 130 that have substantially the same functions as their counterparts in the first mode as shown in FIG. 2.

A receiver is provided with an optical detection block 280 in place of the quantum block and further provided with a data communication section 220, a memory 250 and a communication controller 270 that have substantially the same functions as their counterparts in the first mode. The communication controller 270 according to the present mode has a function of controlling the voltage of a timing signal on the sender side, which will be described later, in addition to a time-direction control function that is similar to the above-described timing control function. The communication controller 270 can communicate with the communication controller 130 in the sender via the data communication sections 220 and 120.

In the optical detection block 280, a short path 204 and a long path 205 are provided in parallel between an optical coupler 203, which is connected to photo detectors APD0 and APD1, and another optical coupler 207, which is connected to the optical transmission line 30. For the short path 204 and long path 205, adjustment is made such that the optical path difference is equivalent to one bit.

An optical signal to be transmitted between the phase modulation block 150 and the optical detection block 280 is a signal whose optical power is at an ordinary level. Therefore, it is not necessary for the optical detection block 280 on the receiver side to perform gated Geiger-mode reception, and the photo detectors APD0 and APD1 operate with a fixed bias.

Specifically, the laser light source 106 is pulse-driven by, for example, a return-to-zero (RZ) signal, and a train of output optical pulses from the laser light source 106 undergoes 0- or $\pi$-phase modulation at the phase modulator 102. After propagating along the optical transmission line 30, the train of optical pulses is split into two trains at the optical coupler 207 in the receiver. The train of optical pulses that has traveled along the short path 204 and the train of optical pulses that has traveled along the long path 205 with a one-bit delay are interfere with each other at the optical coupler 203. As a result, the optical signal is received by APD0 when the phase difference is 0, but is received by APD1 when the phase difference is $\pi$. In other words, when the sender transmits "0-0" or "π-π", the receiver receives it at APD0, and when the sender transmits "0-π" or "π-0", the receiver receives it at APD1.

However, as in the first mode, the timing for the phase modulator 102 to execute modulation cannot be determined by the sender itself and therefore needs to be checked on the receiver side.

4. Fifth Embodiment

4.1) Time-Direction Control of Timing Signal

Figure 21:
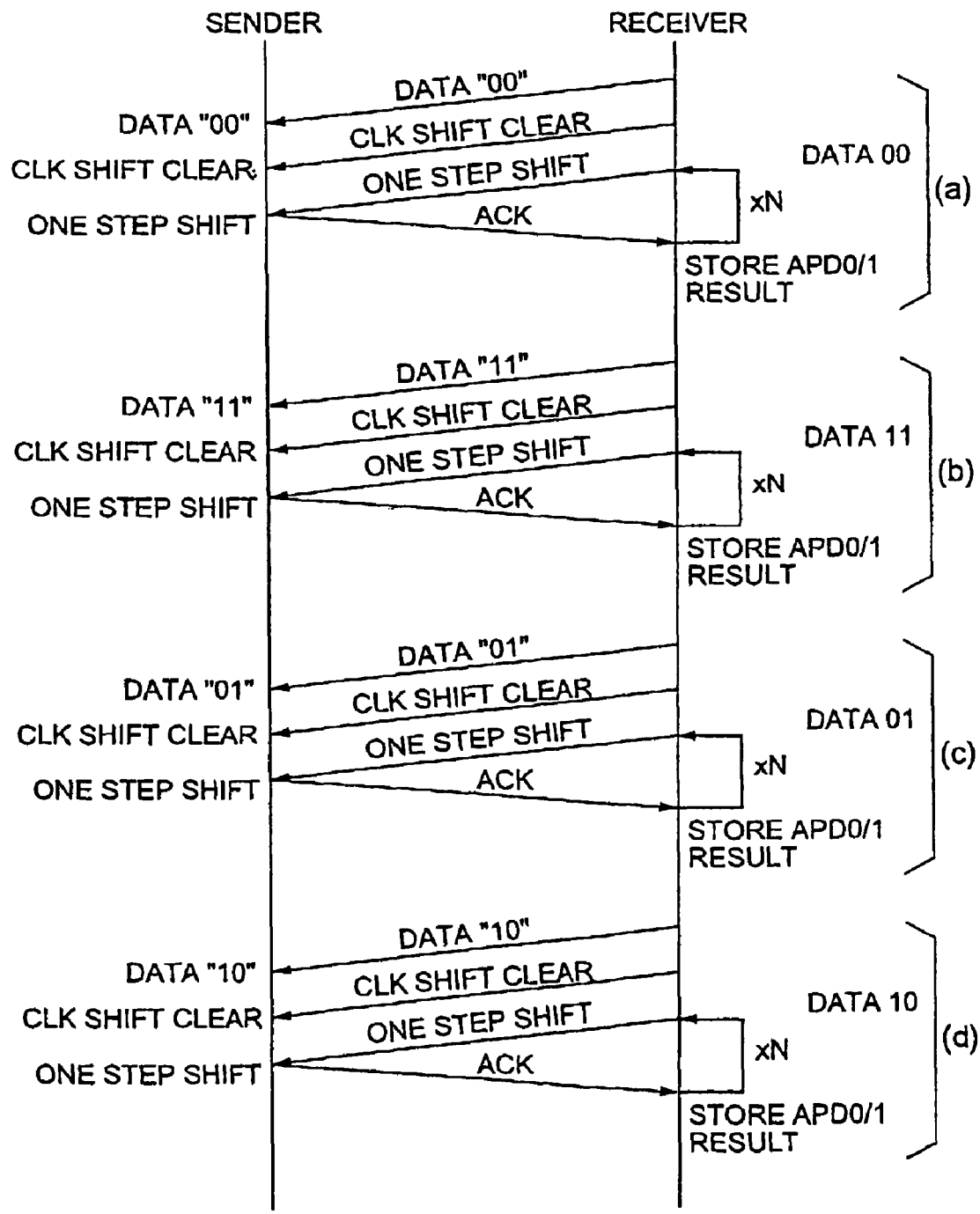
FIG. 21 is a handshake diagram showing a procedure of the control of the sender's timing according to a fifth embodiment of the present invention.
Figure 22:
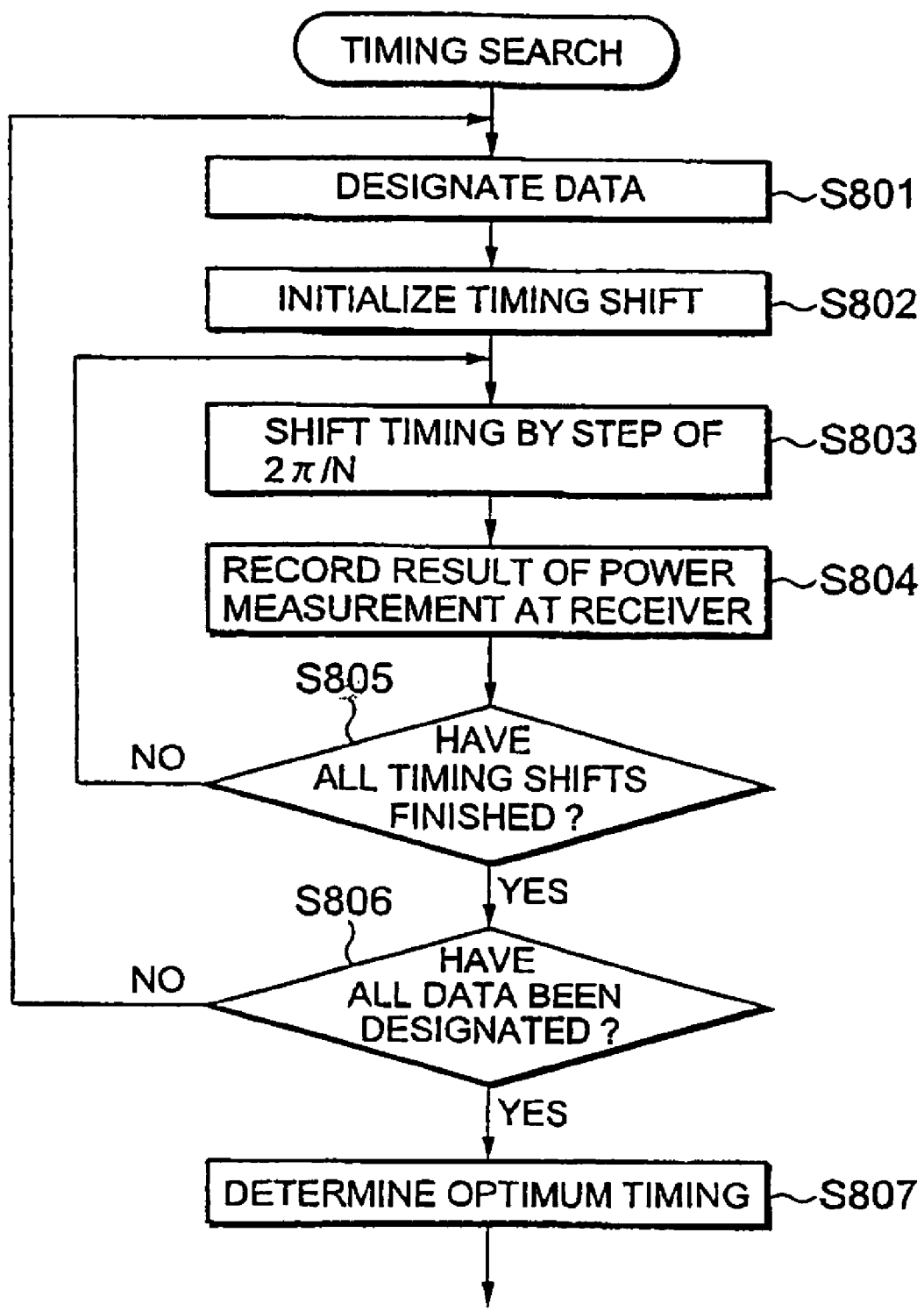
FIG. 22 is a flowchart showing the procedure of the control of the sender's timing according to the fifth embodiment of the present invention.

FIG. 21 is a handshake diagram showing a procedure of the control of the sender's timing according to a fifth embodiment of the present invention, and FIG. 22 is a flowchart showing the procedure of the control of the sender's timing according to the fifth embodiment of the present invention. Control of the sender is all performed under instructions from the receiver. Since the phase modulator 102 in the sender is driven in accordance with a clock supplied from the synchronization block 110, the timing of driving the phase modulator 102 depends on the timing of supplying the clock (clock timing). The synchronization block 110 can shift the clock timing by an arbitrary number of steps ranging from 0 to 2π, under instructions from the communication controller 270 in the receiver.

First, the communication controller 270 in the receiver designates data "00" and notifies it to the sender (S801) and, through the data communication sections 220 and 120, gives the instruction that the synchronization block 110 in the sender clear the amount of clock shift to 0 (SBO2). Subsequently, the following steps are repeated until the amount of clock shift effected by the synchronization block 110 in the sender reaches 2π.

First, the communication controller 270 in the receiver instructs the communication controller 130 in the sender to shift the clock of the synchronization block 110 in the sender by one step (2π/N). The communication controller 130 in the sender causes the synchronization block 110 to shift the clock by one step (S803). Thus, the timing of driving the phase modulator 102 in the sender deviates by one step. As a result, interference occurs at the optical coupler 203 in the optical detection block 280 of the receiver, and the result of this interference is reflected in the optical power received by APD0 or PD1. The results of measurement of the received optical power obtained by APD0 and APD1 are stored in the memory 250 (S804).

When all the timing shifts have finished (S805: YES), similarly thereafter, the optical powers output to ADP0 and APD1 are measured and stored in the memory 250, for each of the remaining three combinations of transmission data, "11", "01" and "10" (S806).

When measurement is completed for all the four combinations of transmission data (S806: YES), the optimum timing is determined based on the results of measurement stored in the memory 250 (S807). In this event, determined as the optimum timing is a timing shifted by an amount at which the power is output to APD0 when transmission data is "0-0" or "π-π" and the power is output to APD1 when transmission data is "0-π" or "π-0".

4.2) Voltage Control of Timing Signal

However, in practice, it is not sufficient to perform only the time-direction control of the clock. Even when the phase modulator 102 performs modulation to give a phase of "0" or "π", the actual phase is not always "0" or "π". This is because the phase of the phase modulator 102 is controlled by voltage, and the relationship between the applied voltage and the modulation phase varies with the change in the environmental condition such as the ambient temperature of the sender. Therefore, the communication controller 270 in the receiver needs to always monitor the extinction ratio obtained from APD0 and APD1 and, when the extinction ratio is degraded, needs to make fine adjustment of the value of voltage to be applied the phase modulator 102.

Figure 23:
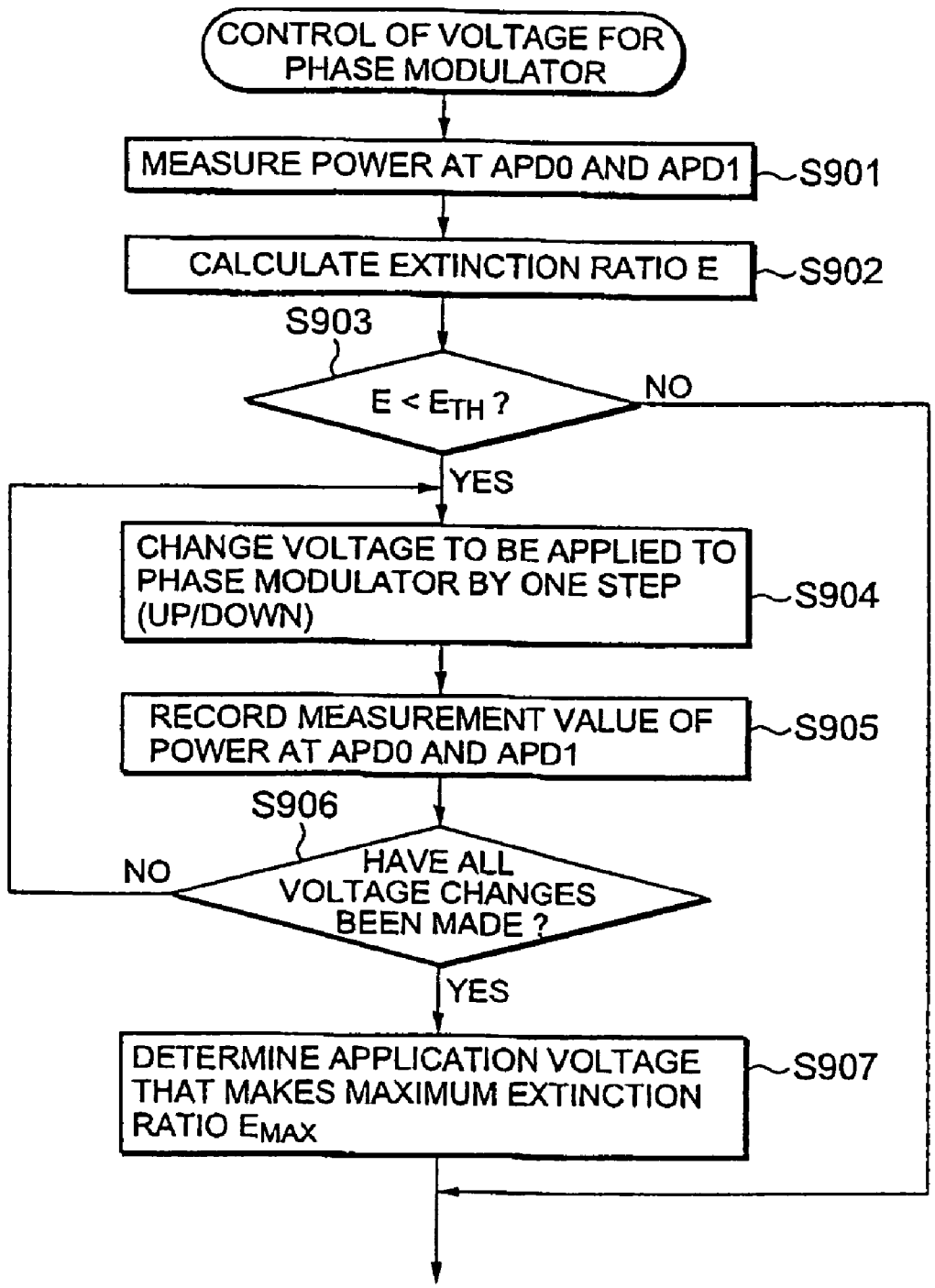
FIG. 23 is a flowchart showing a procedure of the control of voltage to be applied to a phase modulator in the sender according to the fifth embodiment of present invention.

FIG. 23 is a flowchart showing a procedure of the control of the voltage to be applied to the phase modulator in the sender according to the fifth embodiment of the present invention. The communication controller 270 always receives an input of the received optical powers measured by APD0 and APD1 (S901) and calculates the extinction ratio E (S902).

When the extinction ratio E is degraded in comparison with a predetermined threshold value ETH (S903: YES), the communication controller 270 instructs the communication controller 130 in the sender, through the data communication sections 220 and 120, to change (increase or reduce) the voltage to be applied to the phase modulator 102 in the sender by one step (e.g., 100 mV) (S904). Thus, the voltage to be applied to the phase modulator 102 is shifted by one step, which changes the phase of optical pulses. As a result, interference occurs in the receiver, and the result of this interference is reflected in the optical powers received by APD0 and APD1. The results of measurement obtained by APD0 and APD1 are stored in the memory 250 (S905).

The above-described steps S904 and S905 are repeated for the voltage values within a range of, for example, plus/minus 1 v around a predetermined voltage value. Using the results of measurement thus stored in the memory 250, a voltage value at which the largest extinction ratio E is obtained is set as the optimum voltage.

By optimizing the voltage to be applied to the phase modulator 102 as described above, the above-described time-direction control for optimization can be effectively performed. Note that the communication controller 270 having the functions of time-direction control and voltage control of the timing signal on the sender side is not only used in the present embodiment but also may be provided to the aforementioned first embodiment in place of the communication controller 230 and timing controller 240 in the receiver.

4.3) Advantages

As described hereinabove, according to the present embodiment, under the control of the receiver 20, the timing of phase modulation in the sender 10 is first shifted by one step after another, and each time the timing is shifted by one step, the result of detection obtained at the receiver 20 is stored in the memory 250. Based on the stored data, the optimum timing of phase modulation in the sender 10 is determined. Accordingly, it is possible for the receiver side to check whether or not the timing of phase modulation in the sender is right. Moreover, according to the present embodiment, the extinction ratio is always monitored in the receiver, and when the extinction ratio is degraded, fine adjustment is made in the voltage for driving the phase modulator, whereby phase modulation can be properly performed. By controlling as described above, it is possible to achieve an optical communication system that is capable of stable and highly reliable phase modulation.

The present invention is applicable not only to two-way quantum key distribution systems such as the above-described plug and play systems, but also to one-way quantum key distribution systems. In addition, the present invention is applicable to all systems in quantum cryptographic communications. Moreover, the present invention is not limited to quantum key distribution, but is also applicable to phase modulation systems for general optical communications that are performed with optical signals whose power is at an ordinary level.

The invention claimed is:

1. A communication system comprising:
   a first communication device comprising a modulator for modulating a weak power carrier signal according to transmission information at modulation timing to transmit a modulated weak power signal through a first communication channel; and
   a second communication device comprising:
      a detector for detecting the modulated weak power signal received through the first communication channel; and
      a timing controller for controlling the modulation timing of the first communication device through a second communication channel based on a detection result of the detector.

2. The communication system according to claim 1, wherein the timing controller monitors the detection result of the detector while shifting the modulation timing along time axis to search for a modulation timing providing a desired detection result of the detector.

3. The communication system according to claim 1, wherein the second communication device further comprises a detection timing supplier for supplying a detection timing to the detector, wherein the timing controller controls the detection timing based on the detection result of the detector after having completed control of the modulation timing.

4. The communication system according to claim 3, wherein the timing controller monitors the detection result of the detector while shifting the modulation timing along time axis to search for a modulation timing providing a desired detection result of the detector.

5. The communication system according to claim 1, wherein the second communication device further comprises a modulation controller for adjusting a depth of modulation of the modulator based on the detection result of the detector through the second communication channel.

6. The communication system according to claim 1, wherein the modulator is a phase modulator which provides a phase difference to the carrier signal depending on a modulation control voltage applied to the phase modulator, wherein the modulation timing is a time period during which the carrier signal passes through the phase modulator.

7. The communication system according to claim 6, wherein the timing controller monitors the detection result of the detector while shifting in time a time period during which the modulation control voltage is applied to the phase modulator to search for an application timing of the modulation control voltage at which a desired detection result is obtained.

8. The optical communication system according to claim 1, wherein the plurality of communication channels are wavelength-multiplexed.

9. An optical communication system comprising:
   a first communication device comprising:
      a phase modulator for modulating a weak power optical signal in phase according to a phase control signal corresponding to transmission information at modulation timing to transmit a phase-modulated weak power optical signal through a first communication channel; and
      a first controller for controlling the phase modulator based on modulation timing control signals received through a second communication channel, and
   a second communication device comprising:
      a detector for detecting the transmission information by optical interference of a phase-modulated weak power optical signal received from the first communication device through the first communication channel; and
      a second controller for transmitting the modulation timing control signals to the first communication device through the second communication channel, the modulation timing control signals controlling the modulation timing of the first communication device based on a detection result of the detector.

10. The optical communication system according to claim 9, wherein the second controller sequentially transmits the modulation timing control signal to the first communication device so as to shift in time a time period during which the phase control signal is applied to the phase modulator, wherein every time the time period is shifted, the second controller records a detection result of the detector varying due to the optical interference into a memory.

11. The optical communication system according to claim 10, wherein the second controller determines an application time period of the phase control signal from an amount of shift providing a desired detection result of the detector, based on a change in detection result depending on an amount of shift recorded in the memory.

12. The optical communication system according to claim 9, wherein the phase control signal have a plurality of values, wherein for each of the plurality of values of the phase control signal, the second controller sequentially transmits the modulation timing control signal to the first communication device so as to shift in time a time period during which the value of the phase control signal is applied to the phase modulator, wherein every time the time period is shifted, the second controller records a detection result of the detector varying due to the optical interference into a memory for each of the plurality of values of the phase control signal.

13. The optical communication system according to claim 12, wherein the second controller determines an application time period of the phase control signal from an amount of shift providing a desired detection result of the detector for each of the plurality of values of the phase control signal, based on a change in detection result depending on an amount of shift recorded in the memory for each of the plurality of values of the phase control signal.

14. The optical communication system according to claim 9, wherein the second communication device further comprises a detection timing supplier for supplying a detection timing to the detector, wherein the detector comprises: an optical interference system for causing optical interference of an optical signal received from the first communication device through the first communication channel; and a photo detector for receiving light outputted from the optical interference system, wherein the second controller controls the detection timing based on the detection result of the photo detector, which is obtained by applying a bias voltage for photo detection to the photo detector according to the detection timing, after having completed control of the modulation timing.

15. The optical communication system according to claim 14, wherein the second controller sequentially shifts in time a time period of the detection timing, wherein every time the time period is shifted, the second controller records a detection result of the photo detector into a memory.

16. The optical communication system according to claim 14, wherein the second controller determines a time period of the detection timing from an amount of shift providing a desired detection result of the detector, based on a change in detection result depending on an amount of shift recorded in the memory.

17. The optical communication system according to claim 14, wherein the phase control signal have a plurality of values, wherein for each of the plurality of values of the phase control signal, the second controller sequentially shift in time a time period of the detection timing, wherein every time the time period is shifted, the second controller records a detection result of the photo detector into a memory for each of the plurality of values of the phase control signal.

18. The optical communication system according to claim 17, wherein the second controller determines a time period of the detection timing from an amount of shift providing a desired detection result of the detector for each of the plurality of values of the phase control signal, based on a change in detection result depending on an amount of shift recorded in the memory for each of the plurality of values of the phase control signal.

19. The optical communication system according to claim 14, wherein the control of modulation timing is performed by setting the optical signal at an ordinary optical power and applying the bias voltage for photo detection as a fixed bias to the photo detector; and the control of detection timing is performed by setting the optical signal at a very weak optical power and applying the bias voltage for photo detection to the photo detector according to the detection timing.

20. The optical communication system according to claim 19, wherein the very weak optical power is equal to or lower than 1 photon/pulse.

21. The optical communication system according to claim 9, wherein the plurality of communication channels are wavelength-multiplexed.

22. An optical sender capable of communication with an optical receiver using a plurality of communication channels, comprising:
a phase modulator for modulating a weak power optical signal in phase according to transmission information at modulation timing to transmit a modulated weak power optical signal to the optical receiver through a first communication channel; and
a controller for shifting the modulation timing according to a timing control signal received from the optical receiver through a second communication channel, wherein the optical receiver is caused to control the modulation timing.

23. An optical receiver capable of communication with an optical sender using a plurality of communication channels, comprising:
an optical interference system for causing optical interference of a phase-modulated weak power optical signal received from the optical sender through a first communication channel;
a photo detector for receiving light outputted from the optical interference system; and
a controller for transmitting a timing control signal to the optical sender through a second communication channel to control phase-modulation timing of the optical sender based on a detection result of the photo detector.

24. A quantum key distribution system comprising:
an optical sender having:
a phase modulator for modulating an optical signal in phase according to transmission information at modulation timing to transmit a modulated weak power optical signal to the optical receiver through a first communication channel, and
a controller for shifting the modulation timing according to a timing control signal received from the optical receiver through a second communication channel, wherein the optical receiver is caused to control the modulation timing; and
an optical receiver capable of communication with the optical sender using a plurality of communication channels, the optical receiver having:
an optical interference system for causing optical interference of a phase-modulated weak power optical signal received from the optical sender through a first communication channel,
a photo detector for receiving light outputted from the optical interference system, and
a controller for transmitting a timing control signal to the optical sender through a second communication channel to control phase-modulation timing of the optical sender based on a detection result of the photo detector.

25. A timing control method in transmission of information between a sender and a receiver using a plurality of communication channels, comprising:
at the sender, modulating a weak power carrier signal according to transmission information at modulation timing to transmit a modulated weak power signal to the receiver through a first communication channel;
at the receiver, detecting the modulated weak power signal received from the sender through the first communication channel;
transmitting a timing control signal to the sender through a second communication channel to control the modulation timing of the sender based on a detection result of the modulated weak power signal received from the sender;
at the sender, receiving the timing control signal from the receiver through the second communication channel; and
changing the modulation timing according to the timing control signal.

26. The timing control method according to claim 25, wherein the sender shifts the modulation timing along time axis according to the timing control signal and, each time the modulation timing is shifted, the receiver monitors the detection result of the signal received from the sender to search for a modulation timing providing a desired detection result.

27. The timing control method according to claim 26, wherein after having completed control of the modulation timing, the receiver monitors the detection result of the signal received from the sender while shifting detection timing in time to search for a detection timing providing a desired detection result.

28. The timing control method according to claim 25, wherein after having completed control of the modulation timing, the receiver monitors the detection result of the signal received from the sender while shifting detection timing in time to search for a detection timing providing a desired detection result.

29. The timing control method according to claim 25, wherein the receiver sequentially transmits the timing control signal to the sender so as to shift the modulation timing for each of a plurality of depths of modulation in the sender, and records a change in the detection result of the signal received from the sender for each of the plurality of depths of modulation.

30. The timing control method according to claim 29, wherein the receiver determines the modulation timing from an amount of shift providing a desired detection result of the signal received from the sender for each of the plurality of depths of modulation, based on the change in the detection result depending on an amount of shift for each of the plurality of depths of modulation.

31. The timing control method according to claim 25, wherein the receiver further transmits a modulation depth control signal to the sender through the second communication channel to change a depth of modulation of the sender, and adjusts the depth of modulation of the sender based on a change in the detection result caused by the modulation depth control signal.

32. The timing control method according to claim 31, wherein the receiver monitors the detection result of the signal received from the sender at all times, transmits the modulation depth control signal to the sender when the detection result is deteriorated into a predetermined level or lower, and adjusts the depth of modulation of the sender based on a change in the detection result caused by the modulation depth control signal.

33. A timing control method in a communication device for communication of information with another communication device using a plurality of communication channels, comprising:
   a) sequentially designating one of a plurality of depths of modulation in the other communication device and transmitting a modulation depth control signal to the other communication device through a first communication channel so as to set the other communication device to the designated depth of modulation;
   b) transmitting a timing control signal to the other communication device through the first communication channel so as to set the modulation timing of the other communication device to an initial value;
   c) transmitting a timing-shift control signal to the other communication device through the first communication channel so as to shift the modulation timing of the other communication device;
   d) detecting a modulated weak power signal which is received from the other communication device through a second communication channel;
   e) repeating the c) and d) a predetermined number of times to record a detection result obtained in the d) for every time the c) and d) are performed;
   f) repeating the a) to e) until all the plurality of depths of modulation have been completed; and
   g) determining a modulation timing of the other communication device based on amounts of shift of the modulation timing with respect to the detection results recorded in the e).

34. The timing control method according to claim 33, wherein a shift range of the modulation timing is limited by the initial value in the a) and the predetermined number of times in the e).

35. The timing control method according to claim 33, further comprising:
   h) after having determined the modulation timing of the other communication device, transmitting a power control signal to the other communication device through the first communication channel to set an optical signal outputted from the other communication device to a very weak power;
   i) sequentially designating one of a plurality of depths of modulation in the other communication device and transmitting a modulation depth control signal to the other communication device through the first communication channel so as to set the other communication device to the designated depth of modulation;
   j) setting detection timing of the communication device to an initial value;
   k) shifting the detection timing;
   l) detecting a modulated signal received from the other communication device through the second communication channel according to the detection timing set in the k);
   m) repeating the k) and l) a predetermined number of times and recording a detection result obtained in the l) every time the k) and l) are performed;
   n) repeating the i) to m) until all the plurality of depths of modulation have been completed; and
   o) determining a detection timing of the communication device based on amounts of shift of the detection timing with respect to the detection results recorded in the m).

36. The timing control method according to claim 35, wherein a shift range of the detection timing is limited by the initial value in the j) and the predetermined number of times in the m).

37. A timing control method in a communication device for communication of information with another communication device using a plurality of communication channels, comprising:
   a) sequentially designating one of a plurality of depths of modulation in the other communication device and transmitting a modulation depth control signal to the other communication device through a first communication channel so as to set the other communication device to the designated depth of modulation; is
   b) transmitting a timing-shift control signal to the other communication device through the first communication channel so as to shift the modulation timing of the other communication device by a first amount of shift;
   c) detecting a modulated weak power signal received from the other communication device through a second communication channel;
   d) repeating the b) and c) until a predetermined shift range has been completed, and recording a detection result obtained in the c) for every time the b) and c) are performed;
   e) repeating the a) to d) until all the plurality of depths of modulation have been completed;
   f) determining an initial modulation timing value of the other communication device based on amounts of shift of the modulation timing with respect to the detection results recorded in the d), and transmitting a timing control signal to the other communication device through the first communication channel so as to set the modulation timing of the other communication device to the initial modulation timing value;
   g) sequentially designating one of the plurality of depths of modulation in the other communication device and transmitting a modulation depth control signal to the other communication device through the first communication channel so as to set the other communication device to the designated depth of modulation;
   h) transmitting a timing-shift control signal to the other communication device through the first communication channel so as to shift the modulation timing of the other communication device by a second amount of shift which is smaller than the first amount of shift;
   i) detecting a modulated weak power signal received from the other communication device through the second communication channel;
   j) repeating the h) and i) a predetermined number of times, and recording a detection result obtained in the i) for every time the h) and i) are performed;

k) repeating the g) to j) until all the plurality of depths of modulation have been completed; and l) determining a modulation timing of the other communication device based on amounts of shift of the modulation timing with respect to the detection results recorded in the j.

38. The timing control method according to claim 37, further comprising: m) after having determined the modulation timing of the other communication device, transmitting a power control signal to the other communication device through the first communication channel to set an optical signal outputted from the other communication device to a very weak power; n) designating one of a plurality of depths of modulation o) setting a detection timing of the communication device to an initial value; p) shifting the detection timing; q) detecting a modulated signal received from the other communication device through the second communication channel according to the detection timing set in the p); r) repeating the p) and q) a predetermined number of times and recording a detection result obtained in the q) every time the p) and q) are performed; s) determining a first detection timing of the communication device based on amounts of shift of the detection timing with respect to the detection results recorded in the r); t) setting a detection timing of the communication device to the first detection timing as an initial value; u) sequentially designating one of all depths of modulation other than the depth of modulation designated in the n); v) shifting the detection timing; w) detecting a modulated signal received from the other communication device through the second communication channel according to the detection timing set in the v); x) repeating the v) and w) a predetermined number of times and recording a detection result obtained in the w) every time the v) and w) are performed; y) repeating the v) to x) until all of the remaining depths of modulation have been completed; and z) determining an optimal detection timing of the communication device based on amounts of shift of the detection timing with respect to the detection results recorded in the x).

39. A program embodied in a computer-readable medium for instructing a computer to perform a timing control method in a communication device for communication of information with another communication device using a plurality of communication channels, the method comprising:
  a) sequentially designating one of a plurality of depths of modulation in the other communication device and transmitting a modulation depth control signal to the other communication device through a first communication channel so as to set the other communication device to the designated depth of modulation;
  b) transmitting a timing control signal to the other communication device through the first communication channel so as to set the modulation timing of the other communication device to an initial value;
  c) transmitting a timing-shift control signal to the other communication device through the first communication channel so as to shift the modulation timing of the other communication device;
  d) detecting a modulated weak power signal which is received from the other communication device through a second communication channel;
  e) repeating the c) and d) a predetermined number of times to record a detection result obtained in the d) for every time the c) and d) are performed;
  f) repeating the a) to e) until all the plurality of depths of modulation have been completed; and
  g) determining a modulation timing of the other communication device based on amounts of shift of the modulation timing with respect to the detection results recorded in the e).

40. The program according to claim 39, wherein a shift range of the modulation timing is limited by the initial value in the a) and the predetermined number of times in the e).

41. The program according to claim 39, further comprising:
  h) after having determined the modulation timing of the other communication device, transmitting a power control signal to the other communication device through the first communication channel to set an optical signal outputted from the other communication device to a very weak power;
  i) sequentially designating one of a plurality of depths of modulation in the other communication device and transmitting a modulation depth control signal to the other communication device through the first communication channel so as to set the other communication device to the designated depth of modulation;
  j) setting detection timing of the communication device to an initial value;
  k) shifting the detection timing;
  l) detecting a modulated signal received from the other communication device through the second communication channel according to the detection timing set in the k);
  m) repeating the k) and l) a predetermined number of times and recording a detection result obtained in the l) every time the k) and l) are performed;
  n) repeating the i) to m) until all the plurality of depths of modulation have been completed; and
  o) determining a detection timing of the communication device based on amounts of shift of the detection timing with respect to the detection results recorded in the m).

42. The program according to claim 41, wherein a shift range of the detection timing is limited by the initial value in the j) and the predetermined number of times in the m).

43. A program embodied in a computer-readable medium for instructing a computer to perform a timing control in a communication device for communication of information with another communication device using a plurality of communication channels, comprising:
  a) sequentially designating one of a plurality of depths of modulation in the other communication device and transmitting a modulation depth control signal to the other communication device through a first communication channel so as to set the other communication device to the designated depth of modulation;
  b) transmitting a timing-shift control signal to the other communication device through the first communication channel so as to shift the modulation timing of the other communication device by a first amount of shift;
  c) detecting a modulated weak power signal received from the other communication device through a second communication channel;
  d) repeating the b) and c) until a predetermined shift range has been completed, and recording a detection result obtained in the c) for every time the b) and c) are performed;
  e) repeating the a) to d) until all the plurality of depths of modulation have been completed;
  f) determining an initial modulation timing value of the other communication device based on amounts of shift of the modulation timing with respect to the detection results recorded in the d), and transmitting a timing control signal to the other communication device through the first communication channel so as to set the modulation timing of the other communication device to the initial modulation timing value;

g) sequentially designating one of the plurality of depths of modulation in the other communication device and transmitting a modulation depth control signal to the other communication device through the first communication channel so as to set the other communication device to the designated depth of modulation;

h) transmitting a timing-shift control signal to the other communication device through the first communication channel so as to shift the modulation timing of the other communication device by a second amount of shift which is smaller than the first amount of shift;

i) detecting a modulated weak power signal received from the other communication device through the second communication channel;

j) repeating the h) and i) a predetermined number of times, and recording a detection result obtained in the i) for every time the h) and i) are performed;

k) repeating the g) to j) until all the plurality of depths of modulation have been completed; and l) determining a modulation timing of the other communication device based on amounts of shift of the modulation timing with respect to the detection results recorded in the j.

44. The program according to claim 43, further comprising:

m) after having determined the modulation timing of the other communication device, transmitting a power control signal to the other communication device through the first communication channel to set an optical signal outputted from the other communication device to a very weak power;

n) designating one of a plurality of depths of modulation;

o) setting a detection timing of the communication device to an initial value;

p) shifting the detection timing;

q) detecting a modulated signal received from the other communication device through the second communication channel according to the detection timing set in the p);

r) repeating the p) and q) a predetermined number of times and recording a detection result obtained in the q) every time the p) and q) are performed;

s) determining a first detection timing of the communication device based on amounts of shift of the detection timing with respect to the detection results recorded in the r);

t) setting a detection timing of the communication device to the first detection timing as an initial value;

u) sequentially designating one of all depths of modulation other than the depth of modulation designated in the n);

v) shifting the detection timing;

w) detecting a modulated signal received from the other communication device through the second communication channel according to the detection timing set in the v);

x) repeating the v) and w) a predetermined number of times and recording a detection result obtained in the w) every time the v) and w) are performed;

y) repeating the v) to x) until all of the remaining depths of modulation have been completed; and z) determining an optimal detection timing of the communication device based on amounts of shift of the detection timing with respect to the detection results recorded in the x).

* * * * *